US010022873B2

(12) United States Patent
Larrea-Tamayo et al.

(10) Patent No.: US 10,022,873 B2
(45) Date of Patent: Jul. 17, 2018

(54) APPARATUSES, SYSTEMS, AND METHODS FOR TRANSFORMABLE LIVING SPACES

(71) Applicant: Ori, Inc., Boston, MA (US)

(72) Inventors: Hasier Larrea-Tamayo, Cambridge, MA (US); Ling Y. Liu, Wayland, MA (US); Kent Larson, Boston, MA (US); William Lark, Burbank, CA (US)

(73) Assignee: Ori Inc., Boston, MA (US)

( * ) Notice: Subject to any disclaimer, the term of this patent is extended or adjusted under 35 U.S.C. 154(b) by 295 days.

(21) Appl. No.: 14/775,843

(22) PCT Filed: Mar. 14, 2014

(86) PCT No.: PCT/US2014/028747
§ 371 (c)(1),
(2) Date: Sep. 14, 2015

(87) PCT Pub. No.: WO2014/144368
PCT Pub. Date: Sep. 18, 2014

(65) Prior Publication Data
US 2016/0031090 A1    Feb. 4, 2016

Related U.S. Application Data

(60) Provisional application No. 61/799,728, filed on Mar. 15, 2013.

(51) Int. Cl.
*B25J 13/08* (2006.01)
*E04B 1/343* (2006.01)
(Continued)

(52) U.S. Cl.
CPC ............ *B25J 13/084* (2013.01); *A47B 85/00* (2013.01); *B25J 9/0003* (2013.01); *B25J 9/1694* (2013.01);
(Continued)

(58) Field of Classification Search
CPC ........ B25J 13/084; A47B 77/04; E04B 1/343
See application file for complete search history.

(56) References Cited

U.S. PATENT DOCUMENTS 5,086,385 A  *  2/1992  Launey  ............... G06F 3/04847
                                                340/6.11
6,880,185 B1     4/2005  McAdams
(Continued)

FOREIGN PATENT DOCUMENTS

GB        2508266 A  *  5/2014  ............. E04H 1/005
GB        2508266 A       5/2014
(Continued)

OTHER PUBLICATIONS

Yo! Home Prototype 21 (Cedar Pesori) Sep. 21, 2012; entire page. http://www.complex.com/art-design/2012/09/the-yo-home-prototype-apartment.
(Continued)

*Primary Examiner* — Thomas Randazzo
(74) *Attorney, Agent, or Firm* — Goodwin Procter LLP

(57) ABSTRACT

The present disclosure provides apparatuses, methods and systems operable to provide transformable living spaces. The system includes a chassis and a configurable unit movably coupled to the chassis for at least one of translation and rotation with respect to the chassis. The system also includes at least one drivetrain assembly movably coupling the configurable unit to the chassis. The system includes at least one actuator coupled to the configurable unit by the at least one drivetrain assembly. The system also includes at least one robotic controller communicatively coupled to the at least one actuator.

15 Claims, 30 Drawing Sheets

(51) Int. Cl.
*E04B 1/348* (2006.01)
*E04B 2/82* (2006.01)
*A47B 85/00* (2006.01)
*B25J 9/00* (2006.01)
*B25J 9/16* (2006.01)
*G06F 3/01* (2006.01)
*G06F 3/0484* (2013.01)
*G06F 3/0488* (2013.01)

(52) U.S. Cl.
CPC ............ *E04B 1/343* (2013.01); *E04B 1/3483* (2013.01); *E04B 2/827* (2013.01); *G06F 3/016* (2013.01); *G06F 3/04847* (2013.01); *G06F 3/04883* (2013.01); *Y10S 901/09* (2013.01)

(56) References Cited

U.S. PATENT DOCUMENTS 7,269,479 B2 * 9/2007 Okamoto ................. B25J 5/007
                                                                                           318/568.12
9,222,255 B2 * 12/2015 Johnson ................. E04B 2/827

FOREIGN PATENT DOCUMENTS

JP           3022654 B2 * 3/2000 ............... E04H 1/02
JP           3022654 B2    3/2000

OTHER PUBLICATIONS

Written Opinion of the International Searching Authority for PCT/US2014/028747 dated Mar. 15, 2013.

* cited by examiner

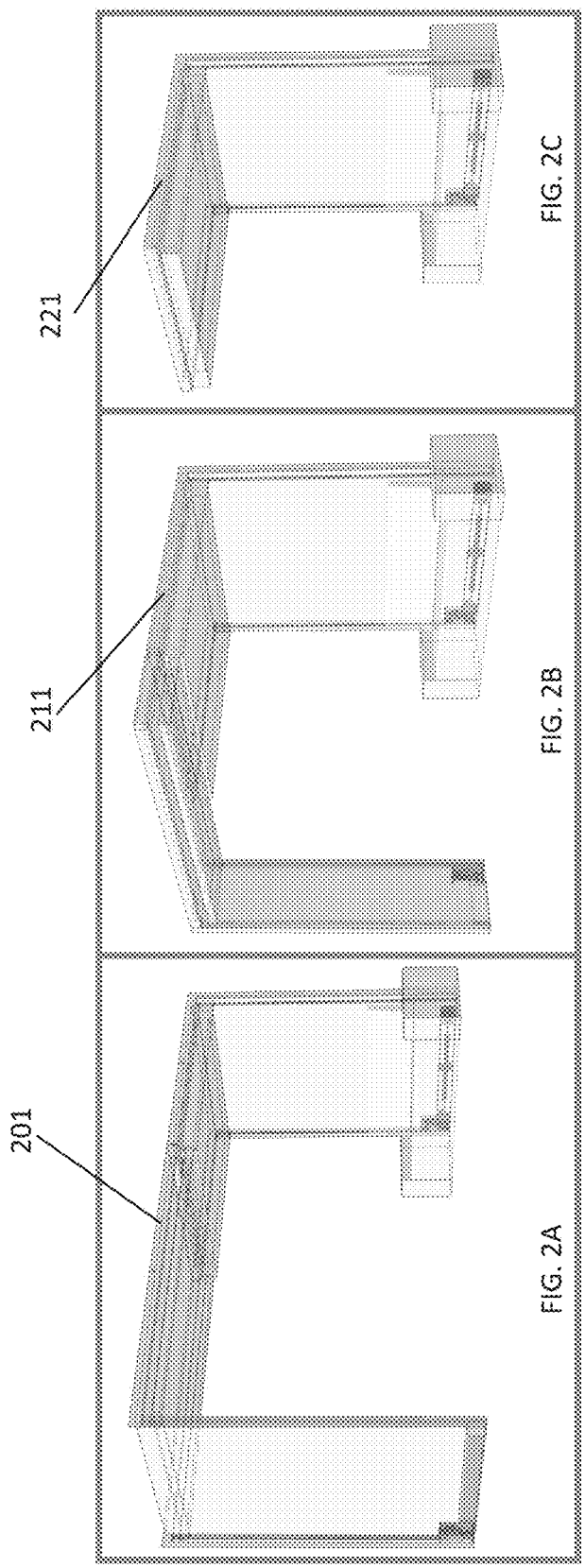

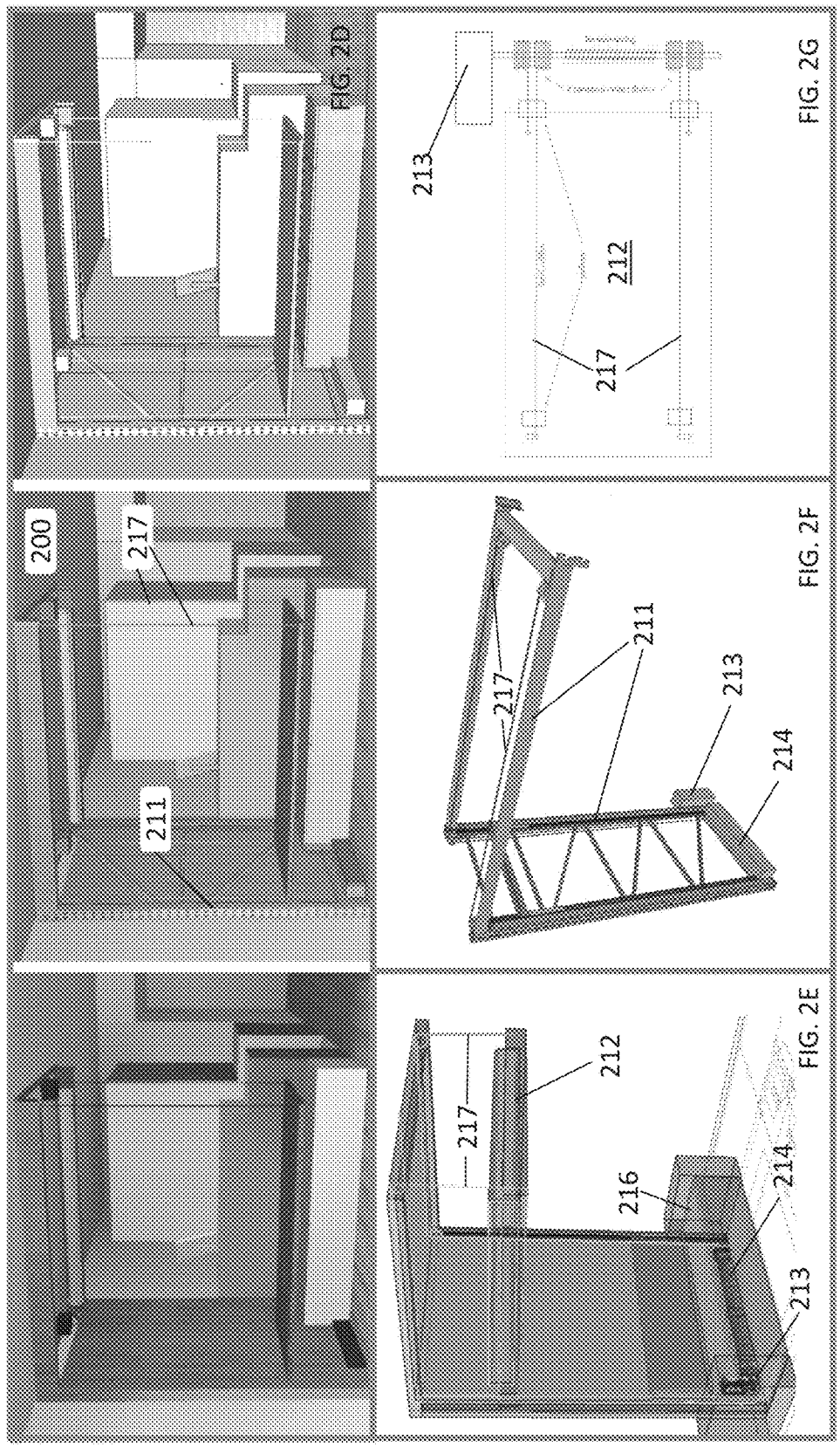

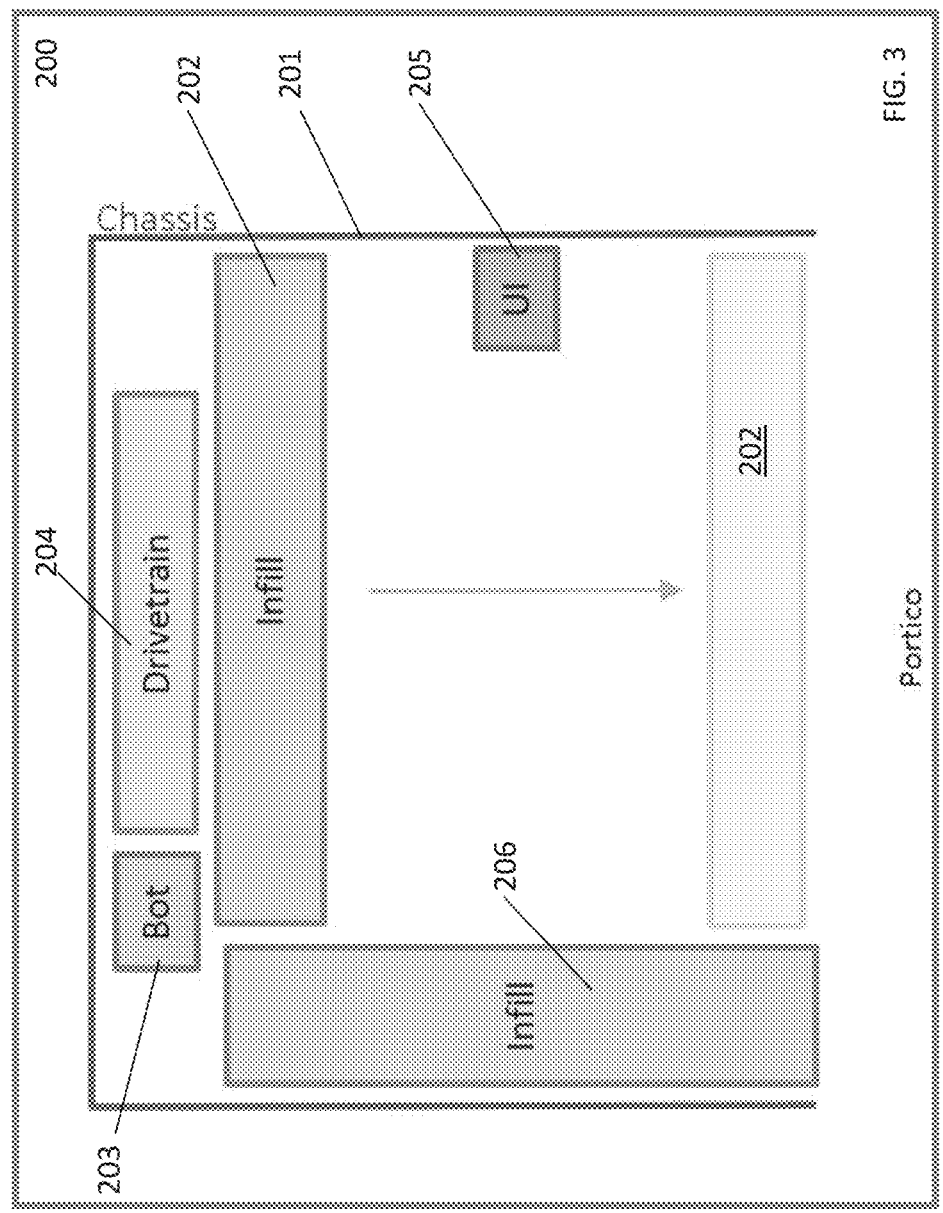

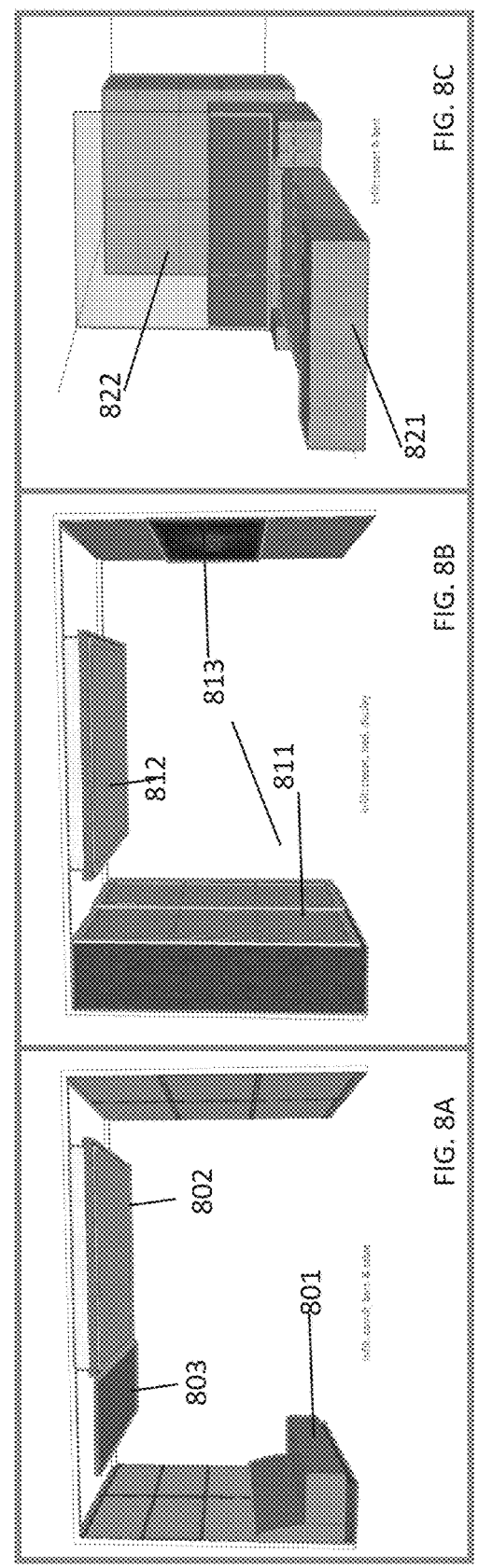

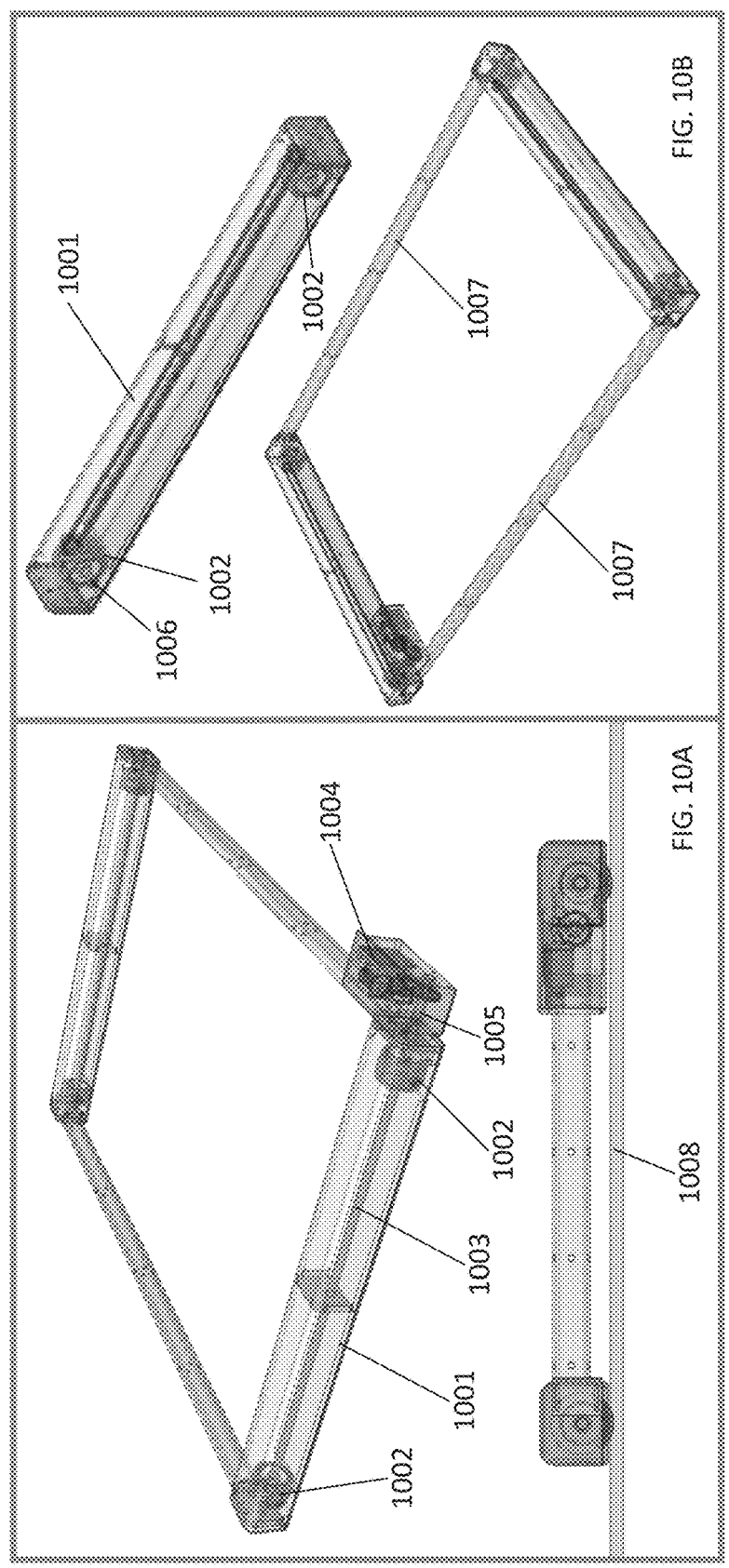

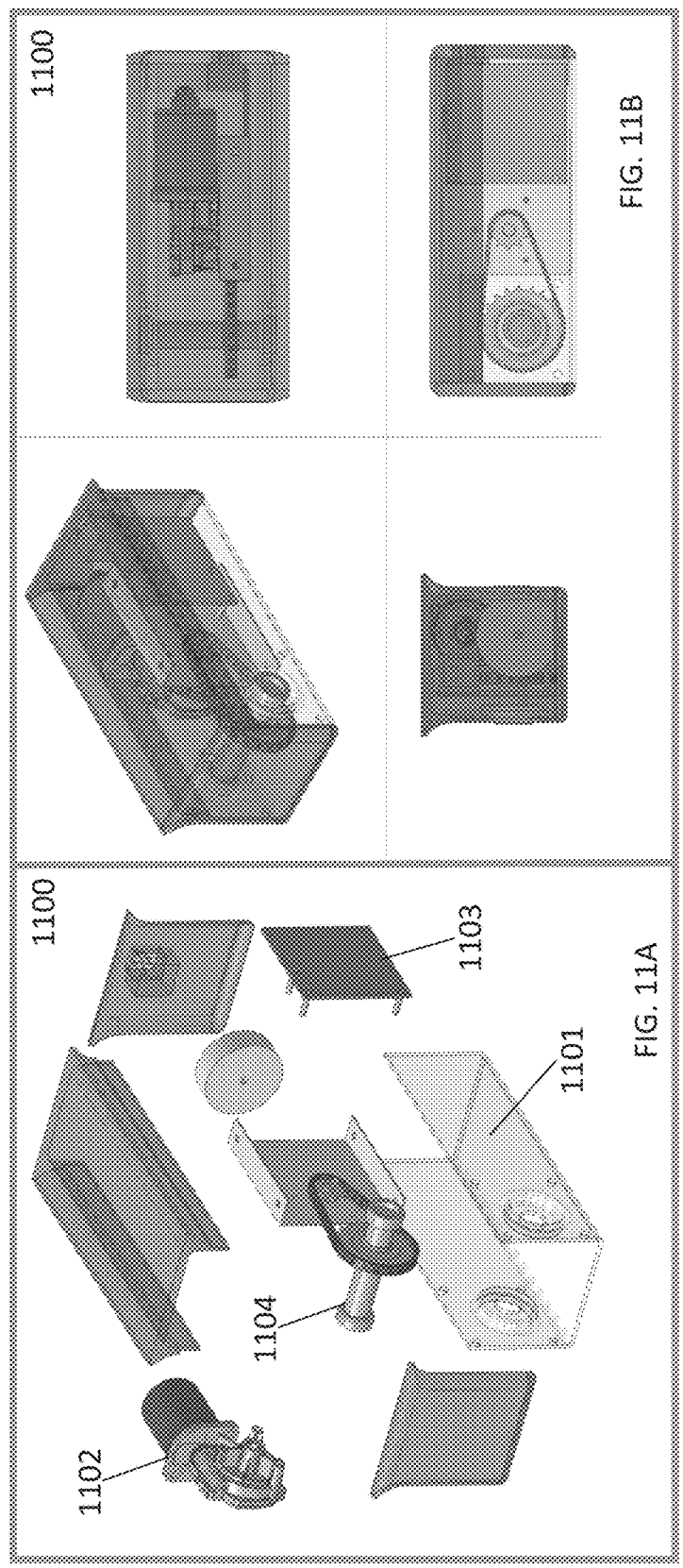

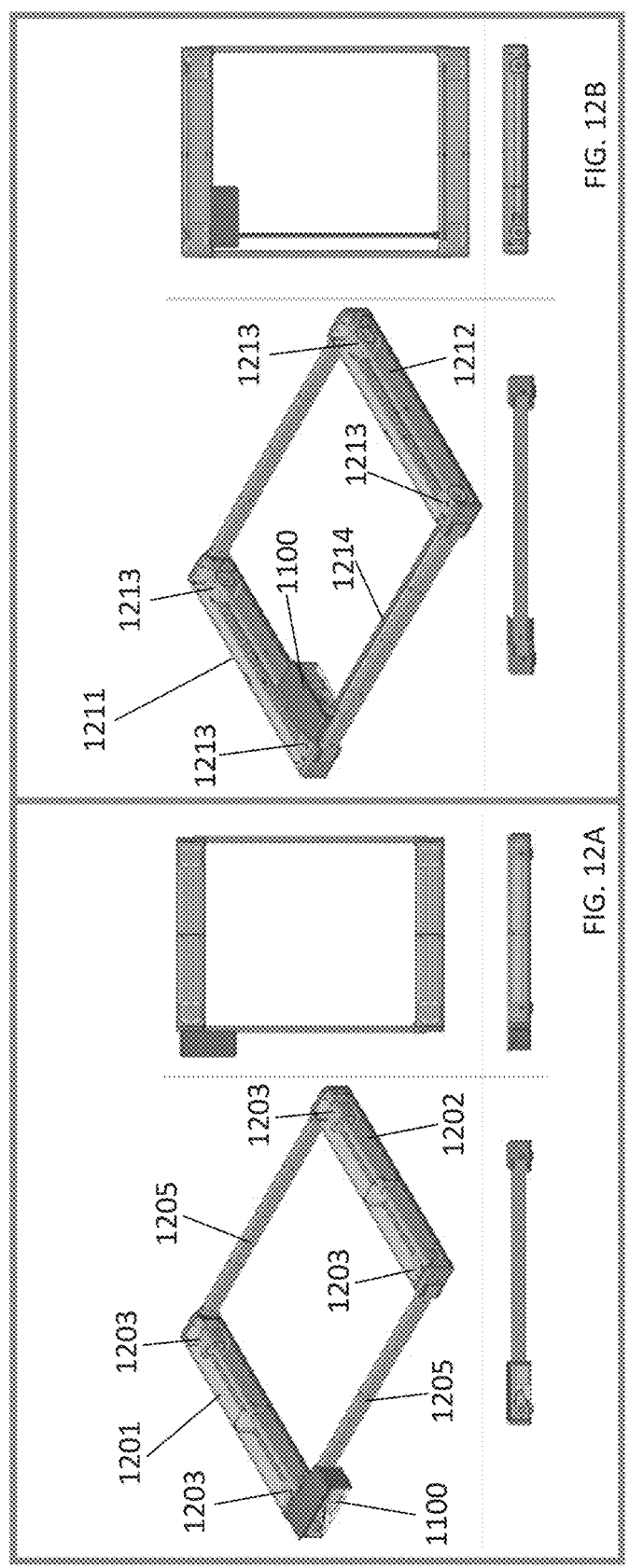

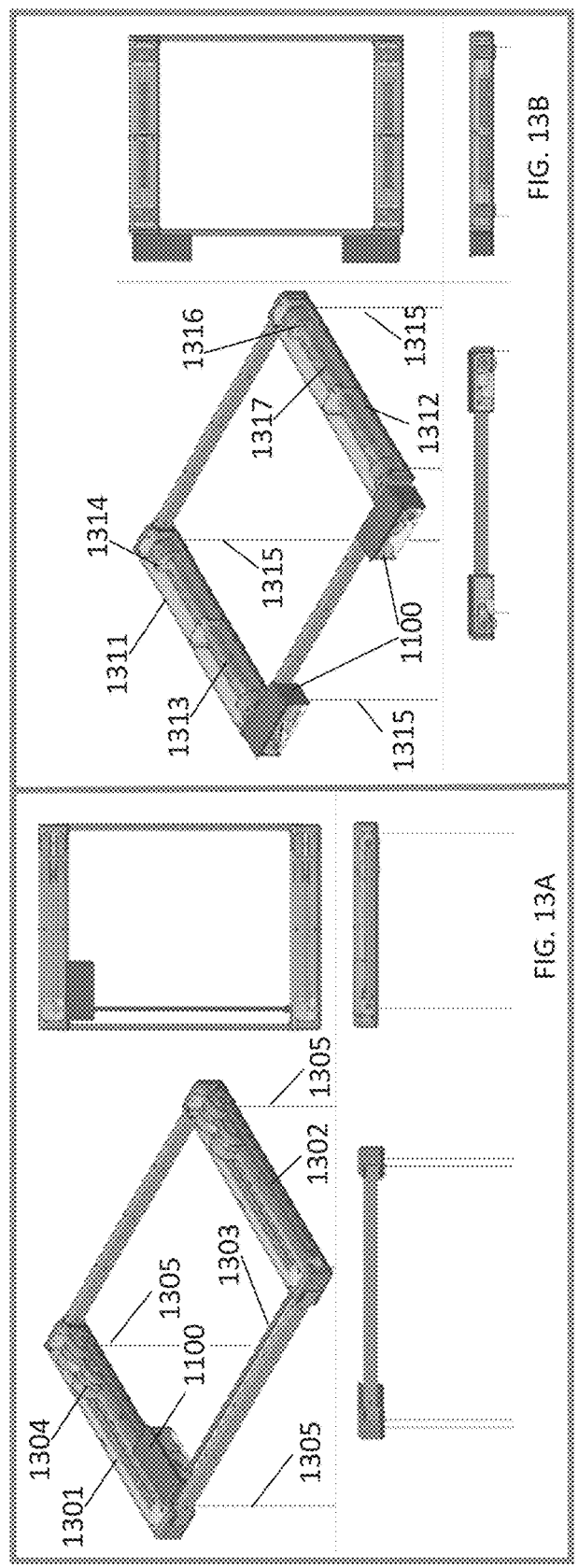

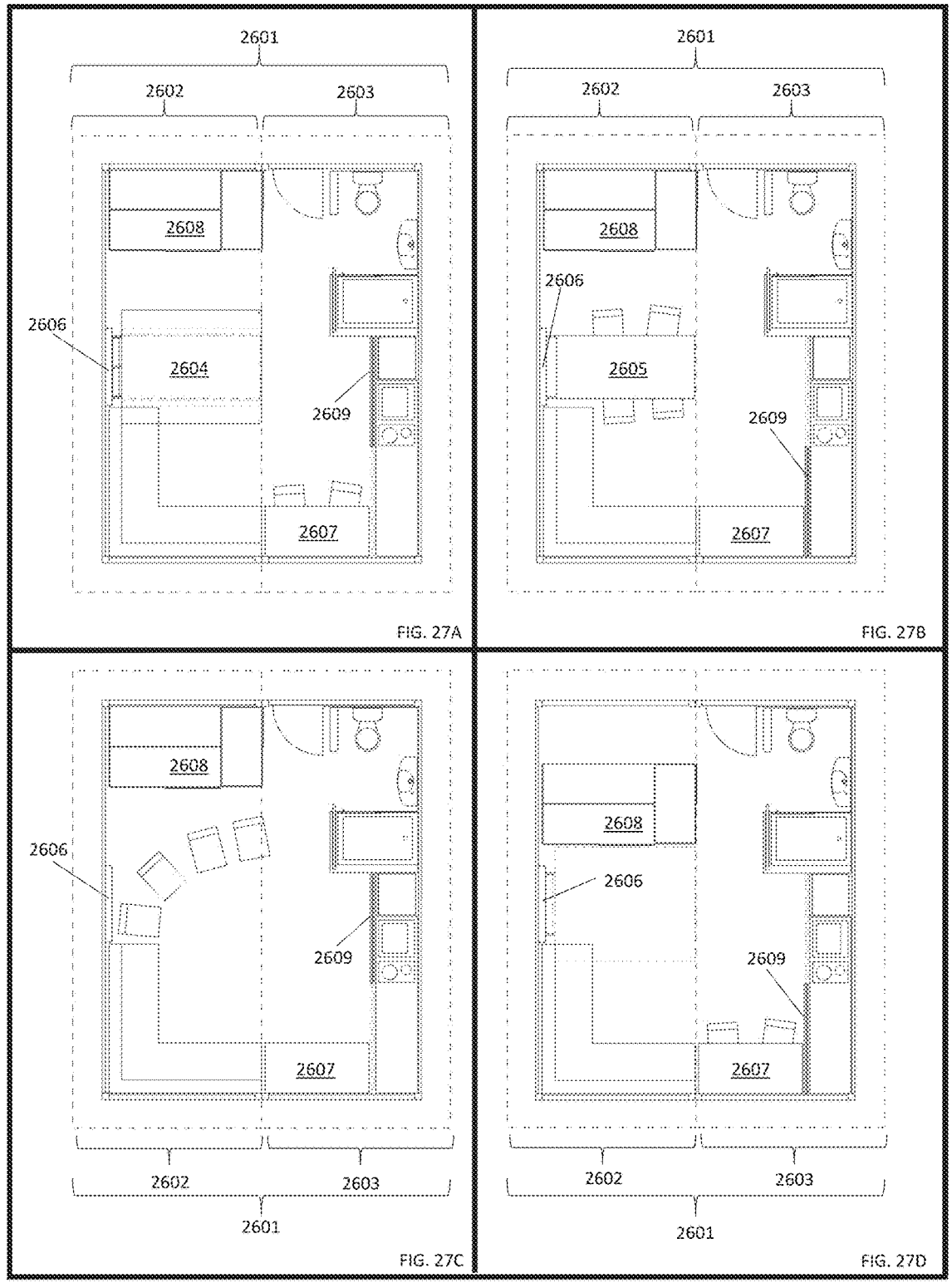

ure may include a floor plan in the range of 200 square feet
APPARATUSES, SYSTEMS, AND METHODS FOR TRANSFORMABLE LIVING SPACES

CROSS-REFERENCE TO RELATED APPLICATION

The present application claims priority to U.S. Provisional Patent Application No. 61/799,728, filed Mar. 15, 2013 and entitled "APPARATUSES, SYSTEMS, AND METHODS FOR TRANSFORMABLE LIVING SPACES," which application is incorporated herein by reference in its entirety.

TECHNICAL FIELD

The present application relates generally to the field of transformable living spaces. More specifically, the present application relates to apparatuses, systems, and methods operable to make a living space transformable.

BACKGROUND

Urban housing is becoming increasingly expensive and local government officials have recognized that the ability to provide affordable housing, for example for urban professionals, may significantly impact the ability of cities to remain globally competitive. In an effort to address the associated expense of urban housing and reduce the costs of urban housing, some developers have experimented with reducing the square footage of housing and have offered micro-units. However, such units may fail to provide individuals with the requisite space suitable for effectively accommodating the diverse and personalized needs of the occupant. For example, if an occupant requires sleeping quarters, storage units, an office space, and an entertainment space, micro-units face significant obstacles in efficiently accommodating such a wide range of needs.

SUMMARY

The inventors have appreciated that living spaces of fixed or limited sizes may be more efficiently used through the implementation of inventive components and systems that allow a living space to be efficiently and effectively transformed for a particular purpose at a particular time. In view of the foregoing, the present disclosure is directed to apparatuses, systems, and methods operable to provide and enable transformation of living spaces. The apparatuses, systems, and methods disclosed implement mechanical structures integrated with active electronic systems and controls to create transformable living spaces and transformable living elements.

Various exemplary embodiments provide an apparatus for transforming a living space that include a chassis, a drivetrain assembly coupled to the chassis, a robotic control system coupled to the drivetrain assembly and including at least one communication interface, at least one configurable unit coupled to the drivetrain assembly, and at least one user interface communicatively coupled to the robotic control system. The at least one user interface is operable to cause a reconfiguration of the at least one configurable unit. The robotic control system may include at least one actuator electrically coupled to the at least one communication interface. The actuator may be configured for rotary actuation. In various embodiments, a drivetrain assembly may be used to transform rotary motion of an actuator to linear motion, thereby assisting with maintaining the actuator in a compact configuration. The robotic control system may include one or more position sensors configured to detect or calculate a position of a configurable unit. The at least one communication interface may include a wireless communication interface. The at least one user interface may be positioned on the configurable unit, or positioned separately from the assembly. The at least one user interface may include a pressure sensor. The pressure sensor may be positioned on the configurable unit such that pressure may be applied in the direction of desired actuation of the configurable unit. The at least one user interface may include a gesture sensor. The at least one user interface may include a graphical user interface, such as a touch screen. The drivetrain assembly may be enclosed in a structural member. The drivetrain assembly may be configured for rotary and/or linear driving. The robotic control system may be removably coupled to the drivetrain assembly. The configurable unit may include at least one piece of furniture. The configurable unit may include at least one appliance. The at least one piece of furniture and the at least one appliance may include one or more proximity sensors configured to detect the proximity of the furniture or appliance with respect to another object. The proximity sensor may be communicatively coupled to the robotic control system. The chassis may include one or more electrical interconnections. The one or more electrical interconnections may provide an electrical pathway for transmitting electrical power from a source to the robotic control system, for example through the drivetrain assembly coupled to the chassis. The chassis may include one or more enclosure components. The enclosure components may be composed of a material and/or have a color corresponding with the configurable unit.

Various exemplary embodiments provide a prefabricated structural enclosure configured to provide a transformable living space. The enclosure may include a metal and wood prefabricated structure with one or more primary systems operable to respond to changes in one or more transformable mechatronic systems positioned therein. The primary systems may include at least one of a modular heating ventilation and cooling (HVAC) component, a modular plumbing component, and modular electrical system component. The modular HVAC component may include components having a communication interface operable to communicate with a robotic control system of an apparatus for transforming a living space. The communication interface may be a one-way interface operable to receive control commands. The modular HVAC component may include an electrically adjustable louver. The modular electrical system component may include lighting component having a communication interface operable to communicate with a robotic control system of an apparatus for transforming a living space or communicate with a central control system. In various embodiments, prefabricated structural enclosure may include a plurality of recessed fastener junctions, a plurality of tracks integrated into at least one surface consisting of at least one wall surface, a floor surface, or a ceiling surface. In various embodiments the prefabricated structural enclosure may include a floor plan in the range of 200 square feet to 800 square feet. In various embodiments, a computer implemented design module, such as a computer generated modeling tool, may be implemented to configure the prefabricated structural enclosure with one or more configurable elements in response to user preferences.

Various exemplary embodiments provide a system for transforming a living space. The system includes a chassis and a plurality of configurable units movably coupled to the chassis for at least one of translation and rotation with respect to the chassis. The system also includes at least one drivetrain assembly movably coupling the plurality of configurable units to the chassis. The system includes at least one actuator coupled to the plurality of configurable units by the at least one drivetrain assembly and at least one sensor coupled to the chassis. The system also includes at least one robotic controller communicatively coupled to the at least one actuator. The at least one robotic controller is configured to electronically control actuation of the at least one actuator coupled to the plurality of configurable units based at least in part on a sensor signal received from the at least one sensor to cause each configurable unit in the plurality of configurable units to cooperatively move from a recessed position to an active position with respect to the other configurable units in the plurality of configurable units by at least one of translation and rotation on the chassis.

In particular embodiments, the at least one robotic controller is configured to poll the at least one sensor before controlling actuation of a configurable unit in the plurality of configurable units to cooperatively move the configurable units. The at least one robotic controller is configured identify a status of one configurable unit in the plurality of configurable units with respect to another configurable unit in the plurality of units, in accordance with particular embodiments. The status may include a distance between the configurable units. In particular embodiments, the plurality of configurable units includes at least one furniture unit. The furniture unit may include at least one of a bed, a table, a desk, and a couch. In particular embodiments, the at least one sensor includes at least one of a pressure sensor, a proximity sensor, a position sensor, an accelerometer, a gyroscope, an inclinometers, and a yaw rate sensor. The at least one actuator and the robotic controller are disposed within an actuator housing removably coupled to the at least one drivetrain assembly, in accordance with particular embodiments. The at least one drivetrain assembly may be positioned in a drivetrain housing where the drivetrain housing is at least a part of the chassis. In accordance with particular embodiments, the chassis includes a plurality of beams extending in a direction having a vertical component and one or more strut beams extending in a lateral direction to couple the plurality of beams. The chassis may be configured to expand and contract in at least one of a lateral direction and a vertical direction. The system may include a movable partition wall coupled to the at least one actuator. In particular embodiments, the at least one robotic controller is electrically coupled to at least one of a light controller, and a sound controller, and the robotic controller is configured to send a control signal to at least one of the light controller and the sound controller in response to a move of the at least one configurable unit in the plurality of configurable units from the recessed position to the active position or from the active position to the recessed position. The plurality of configurable units may include at least one appliance. The at least one sensor includes a first sensor disposed on a first configurable unit in the plurality of configurable units and a second sensor disposed on a second configurable unit in the plurality of configurable units, the first sensor and the second sensor communicatively coupled. The translation may include at least one of lateral translation and vertical translation. The rotation may include rotation about an axis extending in at least one of a vertical direction and horizontal direction. The drivetrain includes one or more of a drive wheel, a cable, a drive shaft, a sprocket, a spring, a damper, a countermeasure, a counterweight, a chain tensioner, and a ribbon, in accordance with particular embodiments. In particular embodiments, at least one configurable unit in the plurality of configurable units includes at least one support leg and wherein the at least one configurable unit is adapted to reconfigure the at least one support leg in response to moving from the recessed position to the active position and in response to moving from the active position to the recessed position. In particular embodiments, the system includes a tactile user interface communicatively coupled to the electronic controller to cause transmission of a command to the at least one robotic controller, where the command provides a directional specific electrical actuation instruction corresponding to a direction of a gesture received via the tactile user interface. In particular embodiments, the system includes a tactile user interface coupled to the configurable unit and communicatively coupled to the electronic controller to cause transmission of a command to the at least one robotic controller, where the command provides a force specific electrical actuation instruction proportional to a detected magnitude of a physical input received via the tactile user interface, such that at least one first detected magnitude of a first physical input causes generation of a first electrical actuation instruction at a first force and a second detected magnitude of a second physical input that is less than the first detected magnitude of a first physical input causes generation of a second electrical actuation instruction at a second force that that is less than the first. The system may include at least one weight sensor coupled to the configurable unit, wherein the at least one robotic controller is configured to electronically control actuation of the at least one actuator coupled to the configurable unit based at least in part on a signal received from the at least one weight sensor.

Various exemplary embodiments provide a system for transforming a living space that include a chassis, and a configurable unit movably coupled to the chassis for at least one of translation and rotation with respect to the chassis. The configurable unit includes at least one support leg. The system also includes at least one drivetrain assembly movably coupling the configurable unit to the chassis and at least one actuator coupled to the configurable unit by the at least one drivetrain assembly. The system further includes at least one robotic controller coupled to the at least one actuator. The at least one robotic controller is configured to electronically control actuation of the at least one actuator coupled to the configurable unit to cause the configurable unit move from a recessed position to an active position by at least one of translation and rotation on the chassis. The configurable unit is adapted to reconfigure the at least one support leg in response to moving from the recessed position to the active position and in response to moving from the active position to the recessed position.

In particular embodiments, the system includes at least one sensor electrically coupled to the at least one robotic controller wherein the at least one robotic controller is configured to electronically control actuation of the at least one actuator coupled to the configurable unit based at least in part on a sensor signal received from the at least one sensor. The system may include a tactile user interface communicatively coupled to the electronic controller to cause transmission of a command to the at least one robotic controller. The command provides a directional specific electrical actuation instruction corresponding to a direction of a gesture received via the tactile user interface.

Various exemplary embodiments provide a system for transforming a living space. The system includes a chassis and a configurable unit movably coupled to the chassis for at least one of translation and rotation with respect to the chassis. The system also includes at least one drivetrain assembly movably coupling the configurable unit to the chassis and at least one actuator coupled to the configurable unit by the at least one drivetrain assembly. The system further includes at least one robotic controller communicatively coupled to the at least one actuator. The at least one robotic controller is configured to electronically control actuation of the at least one actuator coupled to the configurable unit to cause the configurable unit move from a recessed position to an active position by at least one of translation and rotation on the chassis. The system also includes a tactile user interface communicatively coupled to the electronic controller to cause transmission of a command to the at least one robotic controller, where the command provides a directional specific electrical actuation instruction corresponding to a direction of a gesture received via the tactile user interface.

In particular embodiments of the system, a downward gesture on the tactile user interface causes lowering of the configurable unit and an upward gesture on the tactile user interface causes a lifting of the configurable unit. In particular embodiments of the system, a left gesture on the tactile user interface causes translation of the configurable unit in a left direction and a right gesture on the tactile user interface causes translation of the configurable unit in a right direction. In particular embodiments, the at least one sensor is electrically coupled to the at least one robotic controller and the at least one robotic controller is configured to electronically control actuation of the at least one actuator coupled to the configurable unit based at least in part on a sensor signal received from the at least one sensor. The plurality of configurable units may include at least one furniture unit. The tactile interface may include a touch screen.

Various exemplary embodiments provide a system for transforming a living space that includes a chassis and a configurable unit movably coupled to the chassis for at least one of translation and rotation with respect to the chassis. The system also includes at least one drivetrain assembly movably coupling the configurable unit to the chassis and at least one actuator coupled to the configurable units by the at least one drivetrain assembly. The system further includes at least one robotic controller communicatively coupled to the at least one actuator, the at least one robotic controller configured to electronically control actuation of the at least one actuator coupled to the configurable unit to cause the configurable unit move from a recessed position to an active position by at least one of translation and rotation on the chassis. The system also includes a tactile user interface coupled to the configurable unit and communicatively coupled to the electronic controller to cause transmission of a command to the at least one robotic controller. The command provides a force specific electrical actuation instruction proportional to a detected magnitude of a physical input received via the tactile user interface, such that at least one first detected magnitude of a first physical input causes generation of a first electrical actuation instruction at a first force and a second detected magnitude of a second physical input that is less than the first detected magnitude of a first physical input causes generation of a second electrical actuation instruction at a second force that that is less than the first.

In particular embodiments, the user interface includes at least one pressure sensor. The system may also include at least one sensor electrically coupled to the at least one robotic controller and the at least one robotic controller may be configured to electronically control actuation of the at least one actuator coupled to the configurable unit based at least in part on a sensor signal received from the at least one sensor. The plurality of configurable units includes at least one furniture unit, in accordance with particular embodiments. The detected magnitude may be detected based on a speed of the physical input. The user interface may be coupled to the configurable unit.

Various exemplary embodiments provide a system for transforming a living space that include a chassis and a configurable unit movably coupled to the chassis for at least one of translation and rotation with respect to the chassis. The system includes at least one weight sensor coupled to the configurable unit and at least one drivetrain assembly movably coupling the configurable unit to the chassis. The system also includes at least one actuator coupled to the configurable units by the at least one drivetrain assembly and at least one robotic controller communicatively coupled to the at least one actuator. The at least one robotic controller is configured to electronically control actuation of the at least one actuator coupled to the configurable unit based at least in part on a signal received from the at least one weight sensor to cause the configurable unit to move from a recessed position to an active position by at least one of translation and rotation on the chassis.

Various exemplary embodiments provide a prefabricated transformable living space unit that includes a structural enclosure. The structural enclosure includes a plurality of lateral walls extending in a direction having a vertical component and a lateral surface coupling the plurality of lateral walls. The unit also includes a chassis disposed in and coupled to the structural enclosure. The chassis includes a plurality of beams extending in a direction having a vertical component and one or more strut beams extending in a lateral direction to couple the plurality of beams. The chassis is configured to expand and contract in at least one of a lateral direction and a vertical direction. The plurality of configurable units is movably coupled to the chassis for at least one of translation and rotation with respect to the chassis. The at least one drivetrain assembly movably couples the plurality of configurable units to the chassis. The at least one drive train assembly includes at least one actuator. The at least one actuator is coupled to the plurality of configurable units by the at least one drivetrain assembly. The unit also includes at least one sensor coupled to at least one of the chassis and the structural enclosure. The unit further includes at least one robotic controller communicatively coupled to the at least one actuator. The at least one robotic controller is configured to electronically control actuation of the at least one actuator coupled to the plurality of configurable units based at least in part on a sensor signal received from the at least one sensor to cause each configurable unit in the plurality of configurable units to cooperatively move from a recessed position to an active position with respect to the other configurable units in the plurality of configurable units by at least one of translation and rotation on the chassis.

In particular embodiments, the lateral surface is a floor surface. The floor surface may include a plurality of tracks configured to receive drive wheels of a drive train assembly. The structural enclosure includes one or more of water lines, electrical lines, and ventilation lines disposed in at least one of the plurality of lateral walls and the lateral surface. The structural enclosure may include one or more of a door and a window disposed in the plurality of lateral walls.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 2A-2G provide a variety of views of a modular transformation system for drop-down elements embodied in a truss form-factor in accordance with various exemplary inventive embodiments.

FIG. 3 is a schematic of the modular transformation system of FIG. 2.

FIGS. 8A-8C illustrate a configurable infill unit in accordance with various exemplary inventive embodiments.

FIGS. 10A-10B show a drivetrain system configured for rolling actuation with a variety of wheel synchronization options in accordance with various exemplary inventive embodiments.

FIGS. 11A-11B illustrate an interchangeable robotic system configured for removable coupling with a drivetrain system in accordance with various exemplary inventive embodiments.

FIGS. 12A-12B illustrate an interchangeable robotic system coupled to a rolling drivetrain component with single-axle drive and all-wheel drive respectively in accordance with exemplary inventive embodiments.

FIGS. 13A and 13B illustrate multiple coordinated interchangeable robotic systems coupled to a lifting drivetrain component in accordance with exemplary inventive embodiments. 3A illustrates a single interchangeable robot winding the position of multiple spools; whereas, 3B illustrates multiple interchangeable robots being used to wind spools upon a single axle.

FIGS. 23-27D illustrate a modular structural enclosure in accordance with various exemplary inventive embodiments.

The features and advantages of the inventive concepts disclosed herein will become more apparent from the detailed description set forth below when taken in conjunction with the drawings.

DETAILED DESCRIPTION

Following below are more detailed descriptions of various concepts related to, and embodiments of, inventive systems, methods and apparatus for providing transformable living spaces. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Introduction

Various exemplary embodiments are directed generally to apparatuses, systems, and methods for implementation of transformable living spaces. In accordance with exemplary embodiments disclosed herein, living spaces include, but are not limited to, spaces for personal habitation, as well as spaces used for personal and public living, working, recreating, and traveling, whether used for permanent and temporary periods of time. Living spaces, such as micro-sized apartments, may effectively and efficiently offer multiple functions through intelligent coordination of transforming elements. These adaptable elements, such as sleeping quarters, storage units, office areas, entertainment spaces, exercise spaces, etc. may be converted on demand to accommodate the occupants current needs without significant efforts, lifting, or time consumption by the occupant.

Figure 1A:
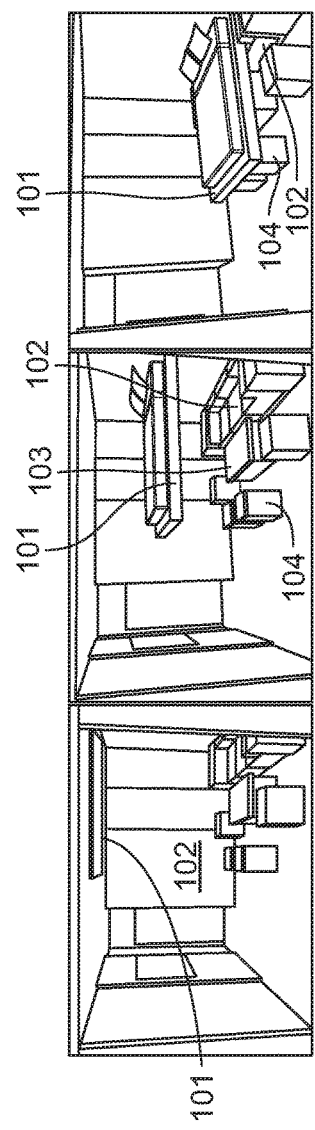
FIGS. 1A-1D illustrate a transformable living space configured in a variety of manners in accordance with exemplary inventive embodiments.
Figure 1B:
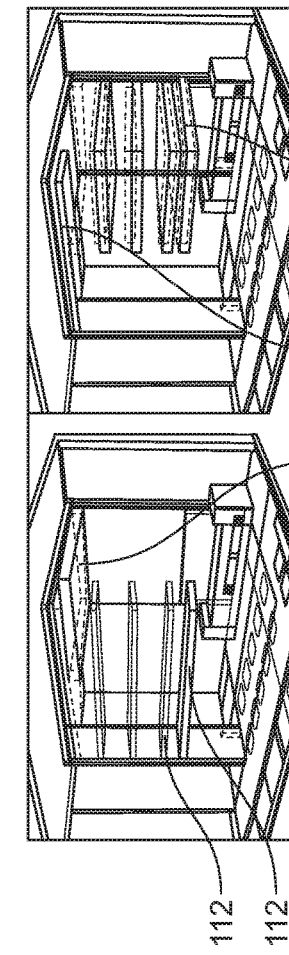
Figure 1C:
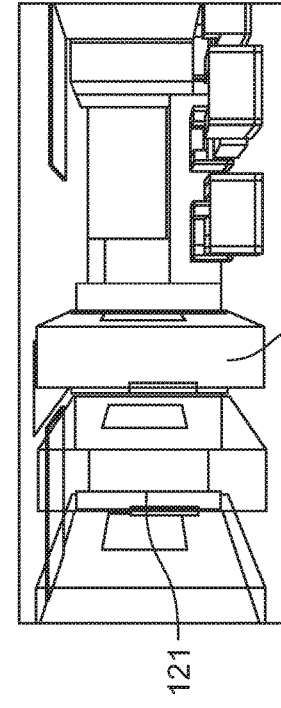
Figure 1D:
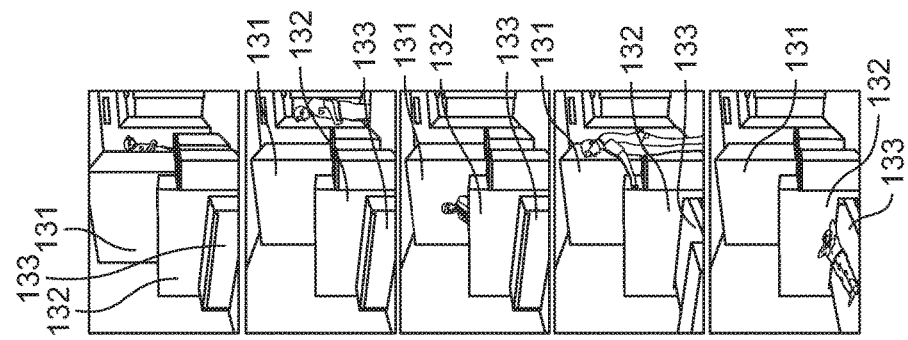

FIGS. 1A-1D illustrate a transformable living space configured in a variety of manners in accordance with exemplary inventive embodiments. FIG. 1A illustrates a transformable living space with drop down bed 101 transitioning from being positioned within a recess or enclosure in the ceiling 105 to an active position (lowered in phase 3) for use by a user. As illustrated in FIG. 1A, various pieces of furniture such as a couch 102, tables 103, benches 104 etc. may be configured to accommodate and/or support other modular pieces. FIG. 1B illustrates a transformable living space with a drop down bed 111 and drop down table 112, which may independently and interchangeably be moved from a stowed or recessed position, for example in a ceiling frame 110, to an active position, such that a user may engage the bed or table component as needed by active engagement of various inventive systems and components discussed further herein. FIG. ID illustrates a transformable living space with a transformable wall 121 movable from one position to another, for example laterally through a room, such that various components in the room or stored within compartments in the movable wall, a stationary wall, a floor, or a ceiling may be actively engaged by one or more users. FIG. ID illustrates a transformable space having a plurality of cooperative and independently accessible units including, but not limited to, a transformable closet 131 or storage unit, a transformable desk unit 132, and a transformable bed unit 133.

Adaptable Living Unit (Zbode™ Modular Transformation System)

A transformable living space as illustrated in FIGS. 1A-1D may be implemented through a variety of systems and components disclosed and illustrated herein. In accordance with some embodiments, a chassis or structural unit may be implemented to support and maintain one or more transformable components or systems. In some exemplary embodiments, the chassis may include a pair of structural rails extending upwards, laterally, and downward. The structural rails may be configured for vertical extension, such that the height of the pair of rails is adjustable and suitable for use in rooms of varying heights, in accordance with various embodiments. The structural rails may be configured for lateral extension, such that the width of the pair of rails is adjustable and suitable for use in rooms of varying widths or lengths, in accordance with various embodiments. The structural rails may include one or more features for securing the rails to structural member such as a wall, ceiling, floor, or a structural support disposed therein. The feature for securing the rails to structural members may include one or more apertures, which may be disposed in a rail or in a bracket extending from the rail. The rails may also include one or more panels configured to enclose the rail system in a substantially concealed, but accessible manner. In some exemplary embodiments, the chassis may include bracket-ends to accommodate existing room obstructions such as baseboards and crown moldings, and integrated power and data lines.

The chassis may include one or more infill units coupled thereto, and may include one or more drive trains, and robotic controllers for moving the one or more infill units. As will be discussed further herein, an infill unit includes one or more pieces of configurable furniture and/or appliances. The position and orientation of the one or more pieces of configurable furniture and/or appliances may be controllably altered through the robotic controller and drive train coupled thereto. The chassis may also include a central user interface operable to implement adjustments to the furniture and or appliances positioned in the infill unit.

Modular Transformation System Example 1: Portico™

FIGS. 2A-2C provide a perspective view of a modular system in accordance with various exemplary inventive embodiments. FIGS. 2A-2C illustrate examples of transformable units including a chassis configured for fastening to structural members of a living space 200. FIG. 2A illustrates a linear over-head chassis 201 configured for fastening to structural members of a living space. Chassis 201 may be configured for lateral or longitudinal expansion or contraction. FIG. 2B illustrates a right angled overhead chassis 211 configured for fastening to structural members of a living space. As demonstrated in FIG. 2B, chassis 211 includes vertical supports that are positioned along multiple axis, which axis are orthogonal in the illustrated embodiment, but may have other orientations in accordance with various embodiments. Chassis 211 may be configured for expansion or contraction laterally or longitudinally as well. FIG. 2C illustrates an over-head chassis 221 having vertical support on a single sides (as opposed to the dual sided supports in FIG. 2A) configured for fastening to structural members of a living space.

FIGS. 2D-2G illustrates a Portico™ system (as depicted in FIGS. 2A-2C) in accordance with various exemplary inventive embodiments. As illustrated in FIGS. 2D-2G, chassis 211 integrates into the Portico™ system 200 to support the cables 217 and guide the transforming infill 212. A stationary infill unit 216 can be also integrated in to the Portico™ 200. In such examples, the drivetrain assembly 214 and robotic controller 213 may also be integrated into the base of the chassis 211. Cables 217 controlled by the drivetrain assembly 214 may traverse both vertically and horizontally to lift and lower a variety of infill 212.

FIG. 3 is a schematic of the modular system of FIG. 2A. In the illustrated embodiment, the chassis 201 is configured in an overhead arrangement and includes a pair of rails or tracks that extend upward from the floor on two sides and extend laterally across. In the illustrated embodiments, chassis 201 is configured to support configurable (infill) unit 202, which may include a bed as illustrated in the pictured embodiment. Bed 202 may be positioned in at least one of two positions including a stored or up position and a deployed or down positioned. In accordance with various exemplary embodiments, the bed may include legs which are passively extended when the bed is lowered into its down position and which are passively retracted when the bed is returned to its stored position. The legs may be configured to retract into a recess, such that the legs are substantially flat with the bottom of the bed in accordance with exemplary embodiments. The bed transforms from a stored or recessed position to a deployed or activated position where the bed is accessible and exposed for use under the control and actuation of robotic control system 203 and drivetrain 204. Robotic control system 203 adds intelligent electronic activation to drivetrain 204. Robotic control system 203 may include multiple power interfaces, multiple power options (wired or wireless) and may contain multiple power and communication inputs and outputs to support additional peripheral components and to communicate with other robotic control systems positioned in space 200. Robotic control system 203 may include a communication interface that accepts multiple inputs, such as inputs from user interface 205 and inputs from sensors such as proximity sensors disposed on the bottom or sides of configurable unit 202 or weight sensors disposed on the top of configurable unit 202. User interface 205 may include a pressure or touch sensitive interface in accordance with various embodiments. In some embodiments, a user interface may include a touch screen display, a gesture or swipe sensitive touch pad, or a graphical user interface. The user interface 205 may be configured such that a downward swipe transmits a signal to robotic control system 203 that initiates an actuator to actuate drivetrain 204 in a deploy manner that causes a lowering of configurable unit 202. Similarly, user interface 205 may be configured such that an upward swipe transmits a signal to robotic control system 203 that initiates an actuator to actuate drivetrain 204 in a store manner that causes a lifting of configurable unit 202. Robotic control system 203 may poll other systems such as proximity sensors and or weight sensors on unit 202 before beginning actuation. In response to initiation of actuation, for example after or while such sensors are polled, robotic control system 203 may also cause other systems such as peripherals, including, but not limited to lighting systems, shades, audio components, etc. to transition to preset conditions, which conditions may be user configurable in accordance with various embodiments. Drivetrain 204 may include a passive mechanical transmission system that may include and be enclosed or packaged in a structural frame or case. Drivetrain unit 204 provides an interface between chassis 201 and unit 204, and as discussed further herein may include other actuation components such as a countermeasure. Other components such as infill unit 206 may be secured to chassis 201. As demonstrated in the illustrated embodiment, stationary units such as unit 206 may be an integral component of a transformable unit.

Modular Transformation System Example 2: Accordion™

Figure 4:
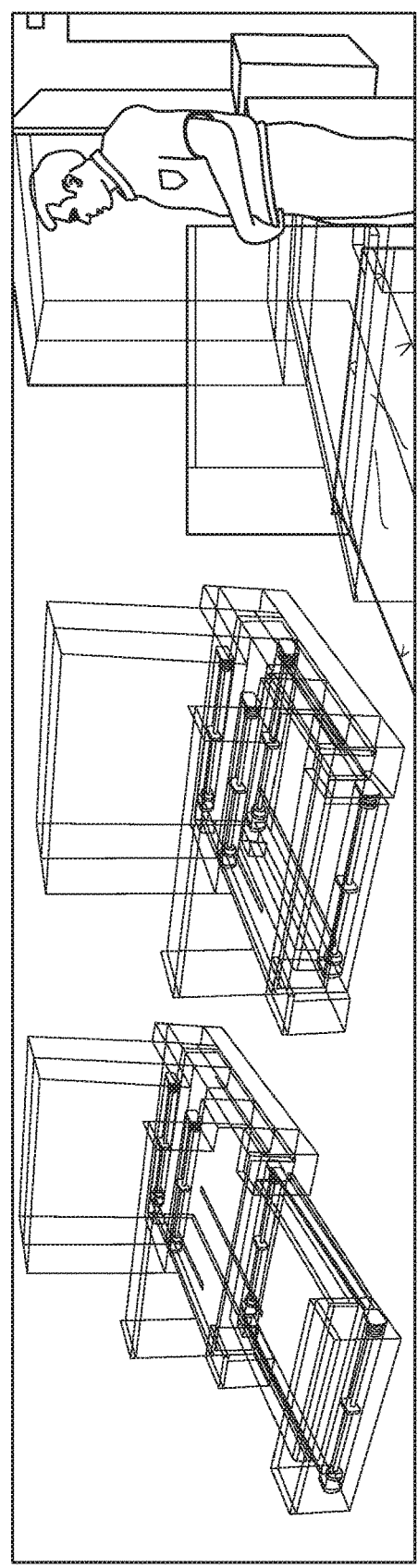
FIG. 4 is a perspective view of another modular transformation system containing a grouping of elements in accordance with various exemplary inventive embodiments.
Figure 5:
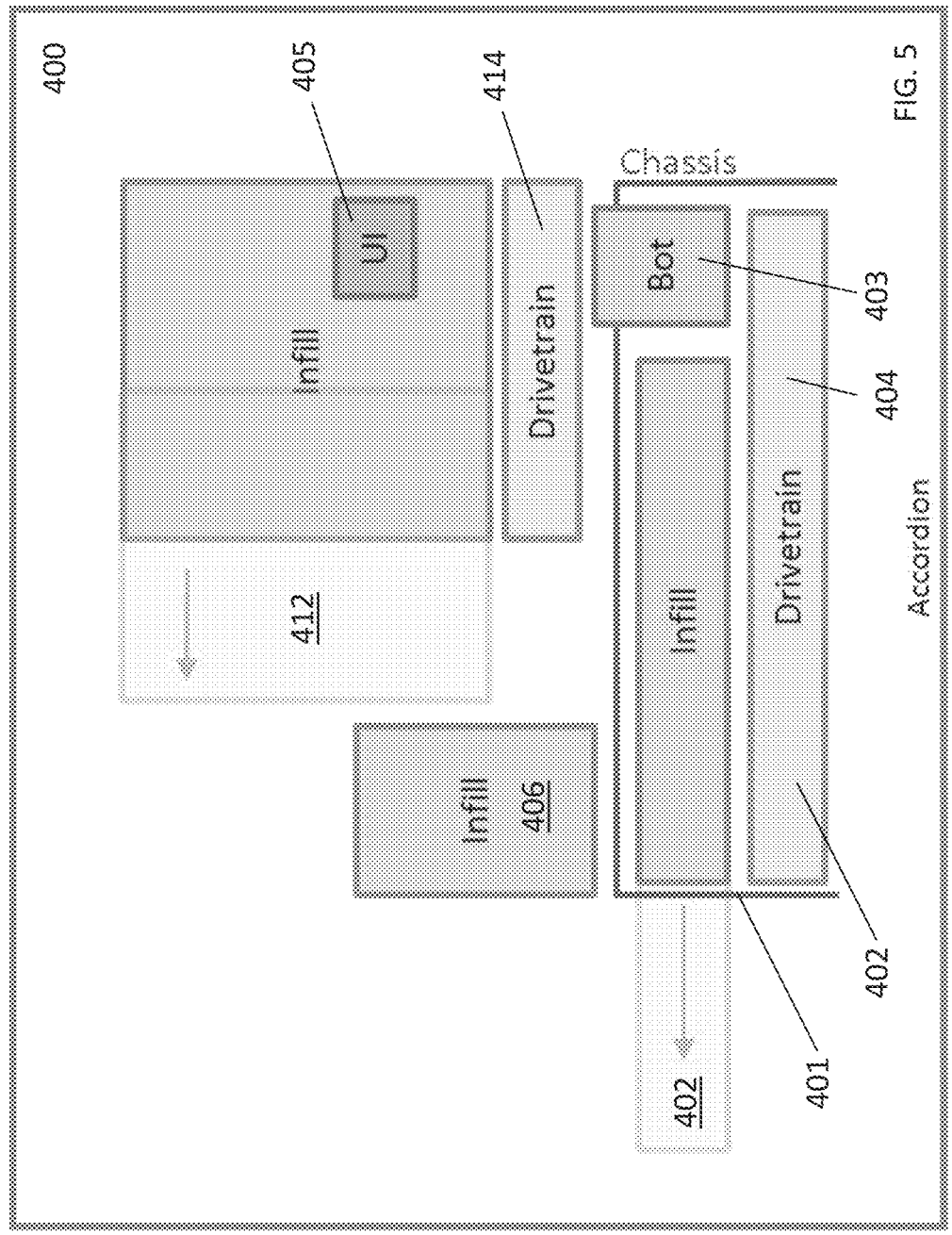
FIG. 5 is a schematic of the modular transformation system of FIG. 4.

FIG. 4 is a perspective view of another modular system in accordance with various exemplary inventive embodiments. FIG. 5 is a schematic of the modular system of FIG. 4. FIGS. 4 and 5 illustrate an example of a transformable unit including a compartmentalized chassis configured for free standing in a living space 400 square feet. In the illustrated embodiment, the chassis 401 is configured for engagement with the floor and supports configurable units extending laterally away from chassis 401 (i.e. unit 402) and units positioned on top of the chassis (i.e. unit 412). Configurable unit 402, which may include a bed as depicted in the pictured embodiment, is configured for extending laterally from chassis 401 via the activation and actuation of robotic control system 403 and drivetrain 404. In the illustrated embodiment, robotic control system 403 is further configured for operation of drivetrain 414 to cause reconfiguration of configurable unit 412, which may include a storage unit such as closet as depicted in the illustrated embodiment. Reconfiguration of unit 412 by drivetrain 414 and robotic control system 403 includes lateral movement of unit 412. Robotic control system 403 may be activated via user interface 405, which like interface 205, may include a pressure or touch sensitive interface, a touch screen display, a gesture or swipe sensitive touch pad or a graphical user interface. The user interface 405 may be configured such that a lateral swipe in the right direction transmits a signal to robotic control system 403 that initiates an actuator to actuate drivetrain 404 or 414 to a deployed state causing an extension of bed 402 from chassis 401 (or similarly a movement of unit 412). Similarly user interface 405 may be configured such that a left swipe transmits a signal to robotic control system 403 that initiates an actuator to actuate drivetrain 404 to a stored state causing a retraction of unit 402. User interface 405 may include a pressure sensor in accordance with various embodiments. The pressure sensor may be positioned on the configurable unit such that pressure may be applied in the direction of desired actuation of the configurable unit. The pressure sensor may also be configured to cause actuation proportional to the amount of force applied and the rate at which the force is applied, to enhance the correlation of the force to the transformation. For example, if a greater force is applied the sensor may be configured to cause an actuator to cause the transformation of a component such as a table or a wall to occur faster, to move further, etc. Robotic control system 403 adds intelligent electronic activation to drivetrains 404 and 414. Robotic control system 403 may contain multiple power and communication outputs to support additional peripheral components and to communicate with other robotic control systems positioned in space 400. Robotic control system 403 may include a communication interface that accepts multiple inputs, such as inputs from user interface 405 and inputs from sensors such as proximity sensors disposed on the front or sides of configurable units 402 or 412 or weight sensors disposed on the top of configurable unit 402. Robotic control system 403 may poll other systems such as proximity sensors and or weight sensors on units 402 and 412 before beginning deploy or retract actuations. In response to initiation of actuation, for example after or while such sensors are polled, robotic control system 403 may also cause other systems such as peripherals, including, but not limited to lighting systems, shades, audio, etc. to transition to preset conditions, which conditions may be user configurable in accordance with various embodiments. The peripheral components may be customizable to a user's preference, and may be configured for automated adjustment, such as increased lighting for dark conditions, or activity levels of users within a space. Drivetrains 404 and 414 may include a passive mechanical transmission system that may include and be enclosed or packaged in a structural frame or case. Drivetrain unit 404 provides an interface between chassis 401 and units 404 and 414, and as discussed further herein may include other actuation components such as a countermeasure. Other components such as stationary unit 406, which includes a table or desk in the illustrated embodiment may be secured to and/or supported by chassis 401.

Figure 6:
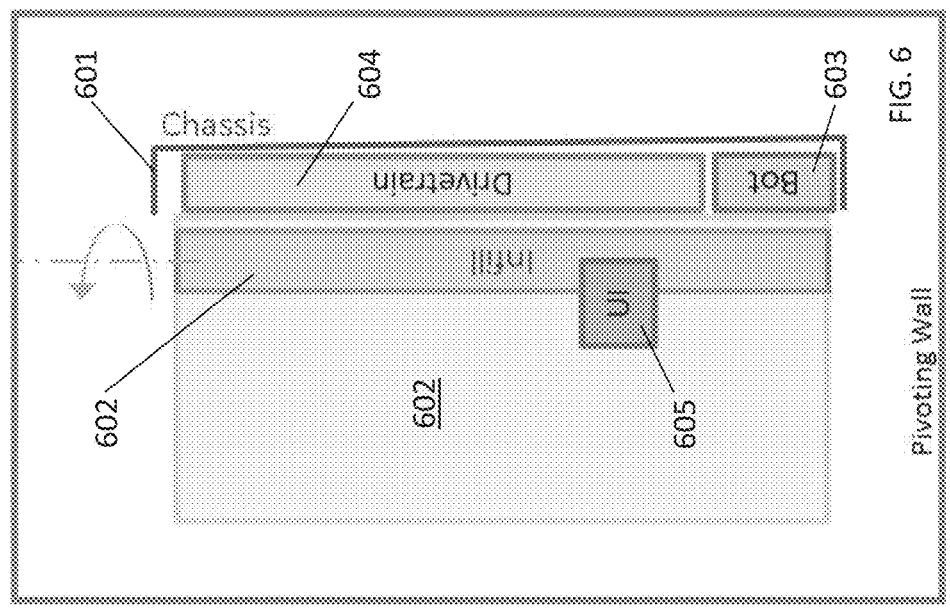
FIG. 6 is a schematic of a pivoting modular transformation system in accordance with various exemplary inventive embodiments.

FIG. 6 is a schematic of a pivoting modular system in accordance with various exemplary inventive embodiments. System 600 includes a chassis 601 that extends generally in a vertical direction, for example from a floor to a ceiling. The system includes a configurable unit 602, an aeroponic wall in the illustrated embodiment, rotatable about an axis via robotic control system 603 and drivetrain 604. Aeroponic wall 602, like other configurable units deployable with system 600 may include distinct decor on each side. Additionally, wall 600 may provide a divider in a deployed configuration (i.e. orthogonal to the wall adjacent to axis 601), and may provide for a more open concept when retracted to a configuration in which wall 602 is substantially parallel to the wall adjacent to chassis 601. System 600 also includes a user interface 605, which may include an interface similar to interfaces, 205 and 405.

Figure 7:
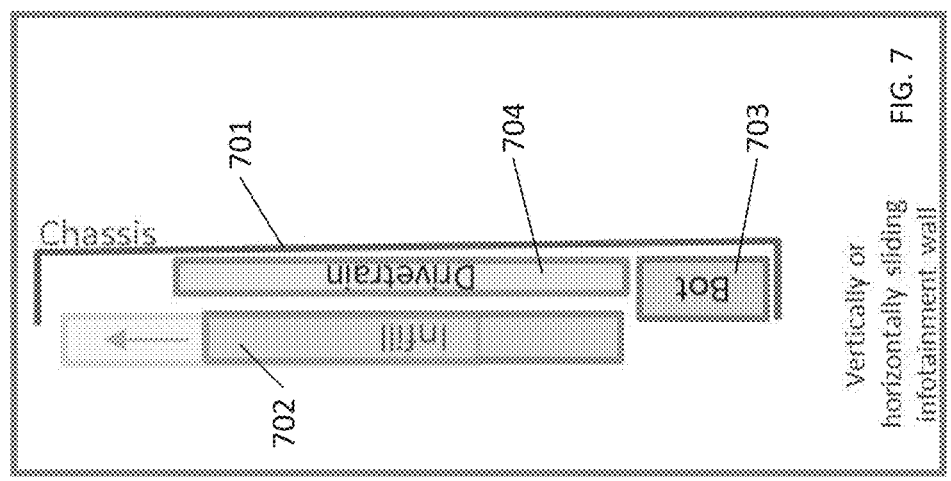
FIG. 7 is a schematic of a vertical wall-sliding modular transformation system in accordance with various exemplary inventive embodiments.

FIG. 7 is a schematic of a vertical wall sliding modular system in accordance with various exemplary inventive embodiments. System 700 includes a chassis 701 that extends generally in a vertical direction, but which also extends laterally and is configured for mounting on a wall. Chassis 701 supports infotainment unit 702, which may be reconfigured in both a lateral and vertical direction via robotic control system 703 and drivetrain 704. Reconfiguration of infotainment unit 702 may be triggered via user interface 705, communicatively coupled to robotic control system 703. User interface 705 may include a pressure sensor, or another touch sensitive input device.

Infill Units

FIGS. 8A-8C illustrate exemplary infill unit in accordance with various exemplary inventive embodiments. FIG. 8A illustrates an infill unit that includes a transformable couch 801, bed 802 and table 803. FIG. 8B illustrates an infill unit that includes a transformable closet 811, bed 812 and display device 813. FIG. 8C illustrates an infill unit that includes a transformable closet 821 and bed 822. The infill units illustrated in FIGS. 8A and 8C provide stand along units that may be implemented in a space, such as an apartment, that is not originally built as a transformable living space. The component of these units may be separable, and may be configured with separate robotic control systems configurable for interactive operation and communication, where the communication may identify the status of one component with respect to one or more other components, such as their distance apart, the distance in the elevation between components, an identification of the actuatable component. Such communications may be wirelessly transmitted between the robotic control systems or from the robotic control systems to a central user interface or control system. The central user interface may be a local interface or may be a remote interface and may communicated to, through, or caused by a remote interface including a mobile device, a personal computing device, or other computing device connectable to one or more networks or servers. In various embodiments the communications may be wired electronic communications. The communications may include detections by various sensors such as proximity sensors, accelerometers, gyroscopes, inclinometers, yaw rate sensors, etc.

Figure 9A:
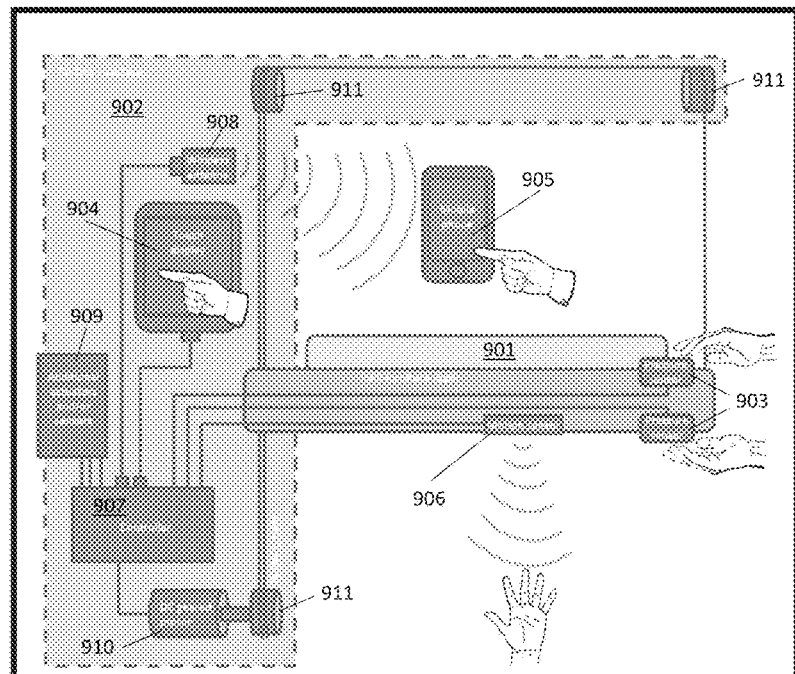
FIGS. 9A-9B show schematic assembly of electromechanical system, including controllers, sensors, displays, and communication between these components.
Figure 9B:
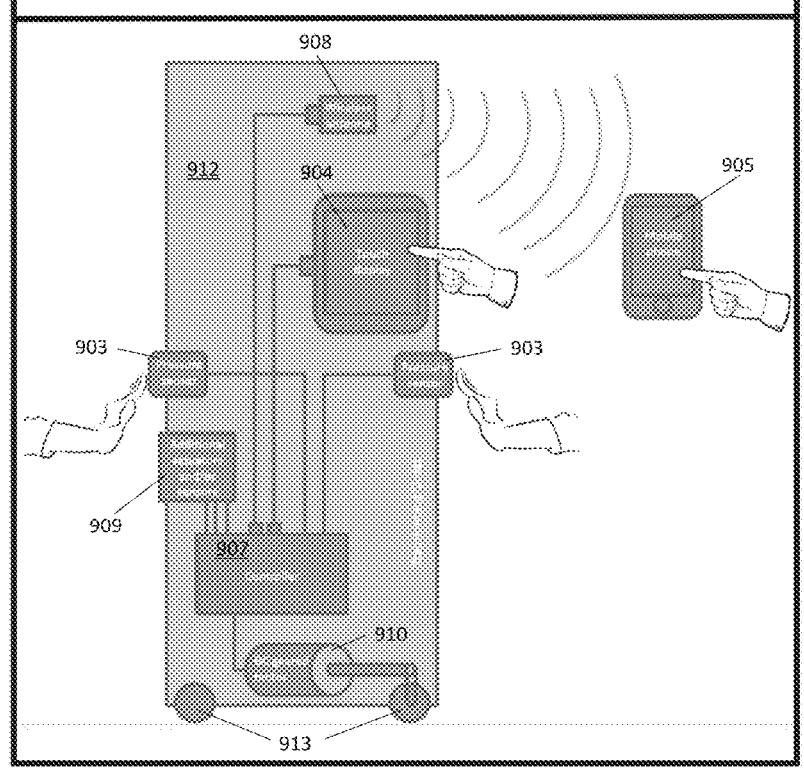

FIGS. 9A-B illustrates schematic assemblies of electromechanical systems for two of the transforming infill units, including controllers, sensors, displays, and communication between these components. FIG. 9 illustrates the coordination between a variety of subcomponents used to actuate a drop-down bed 901 within the Portico™ example 902, also illustrated in FIGS. 8A-B. Similar configurations of componentry may also be used for other drop-down furniture such as tables 803. The bed 901 may be lowered by use of pressure sensors 903. The pressure sensor 903 may also be configured to cause actuation proportional to the amount of force applied and the rate at which the force is applied, to enhance the correlation of the force to the transformation. In cases where the infill, bed 901 or table 803, is out of reach, a motion sensor 906 may be utilized to initiate the infill's lowering. A variety of geared motors 910 with pulley systems 911 may be used to lower the bed 901 and other infill. The motor 910 along with other peripheral components are governed by a controller 907. The controller 907 may maintain wireless communication via internal or external antennae 908 to coordinate with other devices such as mobile phones 905 or tablets. A touch screen 904 may be included within the Portico™ assembly 902 or mounted about another location within the living space to activate the controller 907. In addition to the integrated sensors 903 & 906, the controller 907 may include connection buses to host additional actuators and sensors 909 necessary to interact with the infill 901. FIG. 9B illustrates a similar schematic in which a transforming closet 912 is controlled laterally by pressure sensors 903 as the motor 910 drives wheels 913.

System Assembly Configurations

FIGS. 10A and 10B shows a drivetrain system configured for rolling in accordance with various exemplary inventive embodiments. Drivetrain 1000 also includes an outer casing, casing 1001, which is configured as a structural member. Outer casing 1001 of drivetrain 1000 provides an interface between a chassis and a configurable unit. In some embodiments, casing 1001 may be an integral component of a chassis. Drivetrain 1000 includes a plurality of wheels 1002, which may extend from casing 1001, for example to allow the wheels to roll on a surface such as the floor. Wheels 1002 may be connected by an axle 1003, which may be structurally connected by one or more bearings to case 1001. Case 1001 may also include an opening configured to receive a robotic control system, illustrated here as robotic control system 1004 which may be configured to actuate wheels 1002 via a driveshaft 1005. As demonstrated in FIG. 10B, wheels 1002 may be oriented in a rolling direction parallel to the casing 1001, in contrast to wheels 1002 being oriented orthogonal to casing 1001 in FIG. 10A. If he wheels are oriented parallel to casing 1001 as shown in FIG. 10B, each wheel may include an axle 1006 connected to casing 1001 which axle may be connected to an actuator, such as a rotary motor disposed within robotic control system 1004. FIGS. 10A and 10B further illustrate how a pair of rolling drivetrain assemblies may be coupled to one another by a pair of cross-members 1007. In accordance with various embodiments, a drivetrain such as drivetrain 1000 may be configured to roll along a set of tracks, such as tracks 1008 illustrated in FIG. 10A, to maintain the alignment of the drivetrain.

FIGS. 11A-11B illustrate an interchangeable robotic system configured for removable coupling with a drivetrain system in accordance with exemplary inventive embodiments. Robotic control systems provide intelligent electronic activation to a drivetrain and may be configured in distinct power options. FIG. 1/A illustrates a top view of an exemplary interchangeable robotic system 1100, which is configured in an L shaped casing 1101 in the illustrated embodiment. Casing 1101, which may have a height of four inches or less in various embodiments, may house an actuation unit such as motor 1102 and may include a transfer mechanism such a dual shaft coupling 1104 for engaging a driveshaft of a drivetrain assembly. Casing 1101 may further include a controller 1103 electrically coupled to motor 1102. Controller 1103 may include one or more communication interfaces coupling the controller to a remote user interface. The communication interface may be operable to communicate with other robotic control systems, for example wirelessly, directly device-to-device or over a network. In some embodiments, controller 1103 may be positioned in a distinct portion of casing 1101 in some embodiments, which may be removably coupled to the casing portion housing motor 1102. In various exemplary embodiments, the power interface may include a V+ and ground interface for a brushed motor. Multiple actuating systems 1100 may be coupled electronically. The control system may control at minimum one 1100 and at least two 1100 units.

FIGS. 12A-12B illustrate an interchangeable robotic system coupled to a rolling drivetrain component in accordance with exemplary inventive embodiments. FIG. 12A illustrates robotic control system 1100 coupled to a pair of rolling drivetrain assemblies 1201 and 1202 configured with parallel wheels 1203, which may extend out of the casing housing drivetrain assemblies 1201 and 1202 to contact a surface such a floor. Robotic control system 1100 is coupled to a driveshaft 1204 of assembly 1201. Assemblies 1201 and 1202 are coupled together via a structural members 1205 such that assemblies 1201 and 1202 move together when actuated by control system 1100. FIG. 12B illustrates robotic control systems 1100 coupled to a pair of rolling drivetrain assemblies 1211 and 1212 configured with tandem wheels 1213, which may extend out of the casing housing drivetrain assemblies 1211 and 1212 to contact a surface such a floor. Robotic control system 1100 is coupled to a driveshaft 1214 extending from assembly 1211 to assembly 1212. Assemblies 1211 and 1212 may be further coupled via structural members 1215.

FIGS. 13A and 13B illustrate an interchangeable robotic system coupled to a lifting drivetrain component in accordance with exemplary inventive embodiments. FIG. 13A illustrates robotic control system 1100 coupled to a pair of lifting drivetrain assemblies 1301 and 1302 configured to lift via cables 1305 extending from the drivetrain assemblies. Control system 1100 is connected to a driveshaft 1303 extending between assemblies 1301 and 1302 and coupled to pulleys 1304 disposed assemblies 1301 and 1302, which pulleys 1304 displace cables 1305 extending from assemblies 1301 and 1302. FIG. 13B illustrates control system 1100 connected to a driveshaft 1313 extending through assembly 1311. Driveshaft 1313 is connected to tandem spools 1314, which spools engage ribbons 1315 extending from assembly 1311 to assembly 1312 connecting to spools 1316 in assembly 1312 and thereby driving driveshaft 1317 in assembly 1312 in synchronization with driveshaft 1313. Accordingly, ribbons coupled to driveshafts 1313 and 1317 and extending to and coupled to a configurable unit below assemblies 1311 and 1312 may be deployed and retracted in synchronization.

Figure 14:
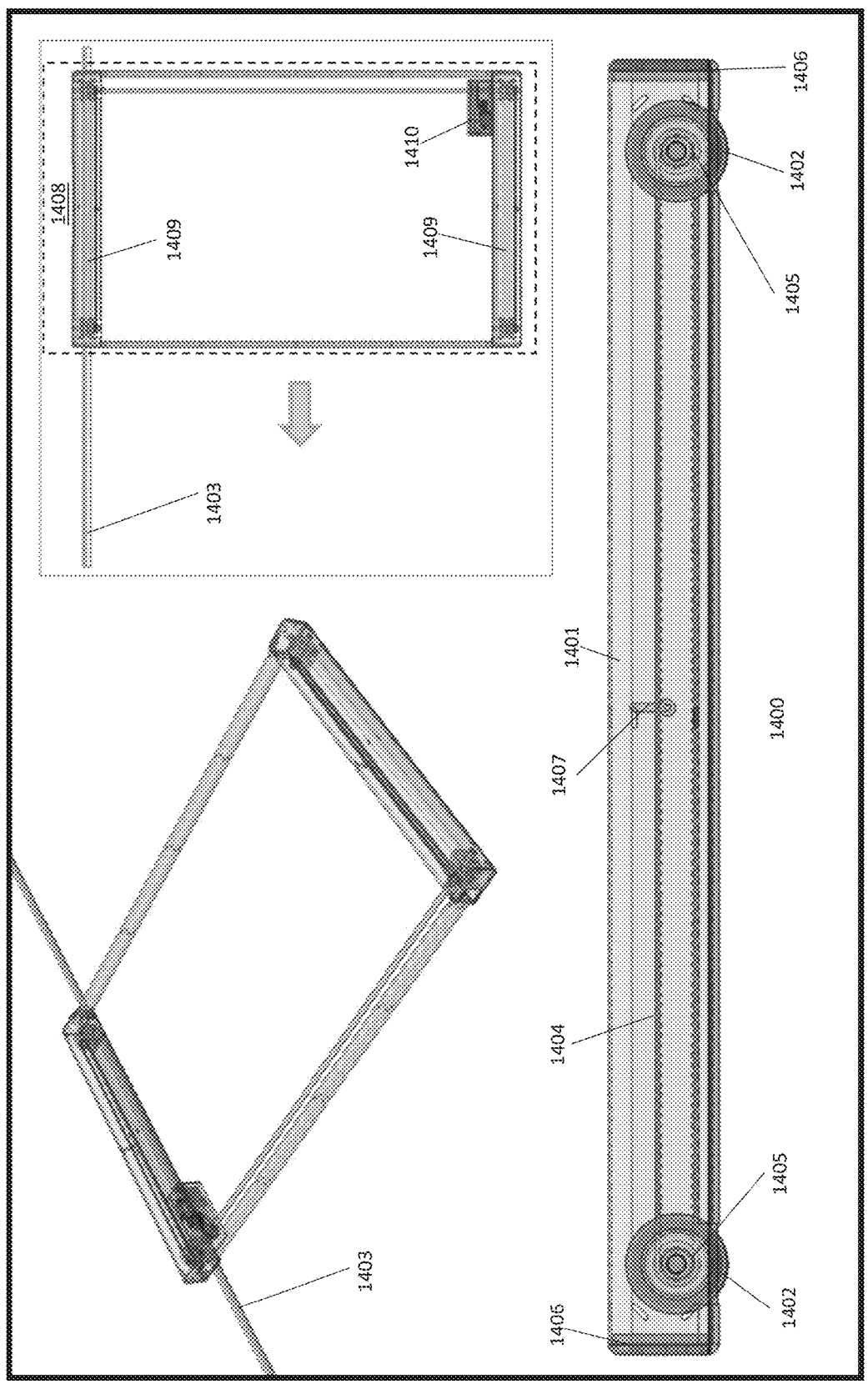
FIG. 14 illustrates a modular rolling cabinet along a guide rail in accordance with various exemplary inventive embodiments.

FIG. 14 illustrates a modular rolling cabinet in accordance with various exemplary inventive embodiments. Various exemplary embodiments include a drivetrain system implemented in the actuation of a configurable unit. FIG. 14 shows an exemplary drivetrain system configured for moving a configurable unit laterally via front and rear synchronized wheels in accordance with various exemplary embodiments. Drivetrain 1409 includes an outer casing 1401, which is configured as a structural member in the illustrated embodiment and may be composed of iron, steel, or aluminum. Drivetrain 1409 includes a plurality of wheels 1402, which in the illustrated embodiments are split for drive and guidance. A guidance rail 1403 may be used on side to ensure alignment of the transforming infill. The total assembly in FIG. 14 may be removably coupled to a configurable unit 1408, such as a bed, storage closet, kitchen island, table, sofa etc. The drivetrain assembly may also include a chain- or belt-tensioner 1407 for maintaining the tension in chain or belt 1404 rotating about sprockets 1405. The outer casing 1401 may include end caps 1406. As shown in the illustrated embodiment, drivetrains 1409 may be provided in a pair and may include a coupling mechanism such as a drive axle to operable to maintain the drivetrains in sync with one another. The drivetrain is further configured for removable coupling with the actuator of a robotic control system. The coupling system may include various components such as sprockets, a drive shaft, belts, etc. In various embodiments, a robotic control system may include a dual female shaft coupling with set screws and a drivetrain may include a male input drive shaft. In accordance with some embodiments, a countermeasure such as a spring, counterweight, damper or other potential-energy element may be positioned in casing 1401 and connected to one or more drivetrain components. FIG. 14 provides a translucent top view of rolling cabinet 1408. Cabinet 1408 includes a pair of drivetrain assemblies 1409 secured to the bottom side of cabinet 1408 in the illustrated embodiment. Also embodied in FIG. 9B, the robotically driven rolling cabinet 912 may include a number of sensors and user interfaces. Drivetrain assemblies 1409 are configured to roll on tracks 1403 pursuant to the actuation of drivetrain assemblies 1409 via robotic controller 1410, thereby moving cabinet 1408 in a lateral direction. Cabinet 1408 may include a user interface such as a pressure sensor 903, which may be wirelessly coupled to controller 1410.

Figure 15:
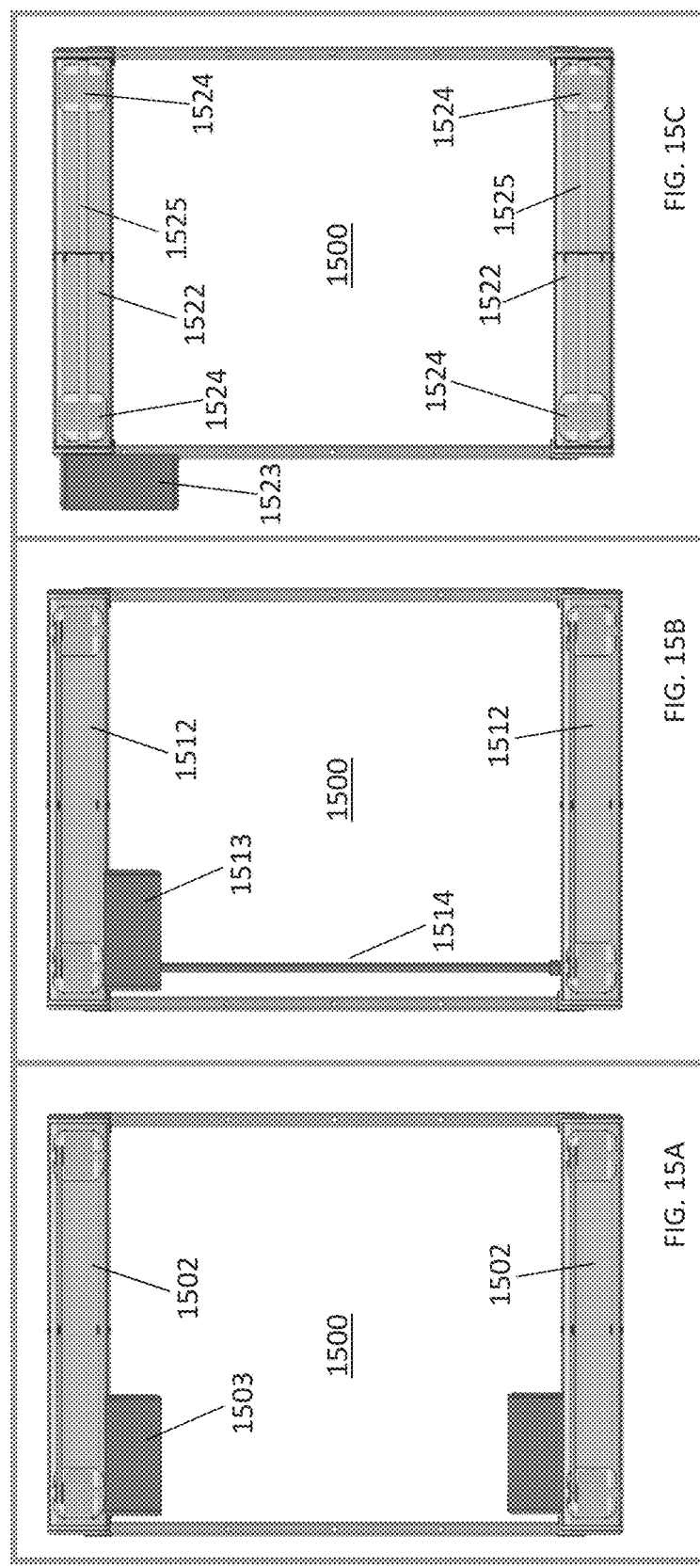
FIGS. 15A-15C illustrate a variety of automated chassis used for the robotic wall in accordance with various exemplary inventive embodiments. The configurations demonstrate options for both two- and four-wheel drive.

FIGS. 15A-15C illustrate a robotic chassis in accordance with various exemplary inventive embodiments. As illustrated in FIGS. 15A-15C, drivetrain assemblies 1502, 1512, and 1522 may be coupled to a variety of furniture units 1500 in a plurality of configurations. In FIG. 15A, drivetrain assemblies 1502, each include a robotic controller 1503, which controllers may be wired or wirelessly coupled to one another. Robotic controller 1503 may be activated via at least one user interface such as a pressure sensor, which may be positioned on wall 1500. In response, for example, to a push from a user furniture unit 1500 positioned above may be laterally translated, in accordance with various embodiments. Unit 1500 may include a storage unit or other furniture item desired for storage. In FIG. 15B, the drivetrain assemblies 1512, coupled to unit 1500, are each coupled to robotic controller 1513 via driveshaft 1514. Robotic controller 1513 may be activated via at least one user interface such as a pressure sensor, which may be positioned on the furniture unit 1500. In FIG. 15C, drivetrain assemblies 1522 include wheels 1524 that are coupled via an axle 1525. At least one of drivetrain assemblies 1522 is coupled to a robotic controller 1523 and the drive train assemblies are each coupled to unit 1500 in the illustrated embodiment.

Figure 16:
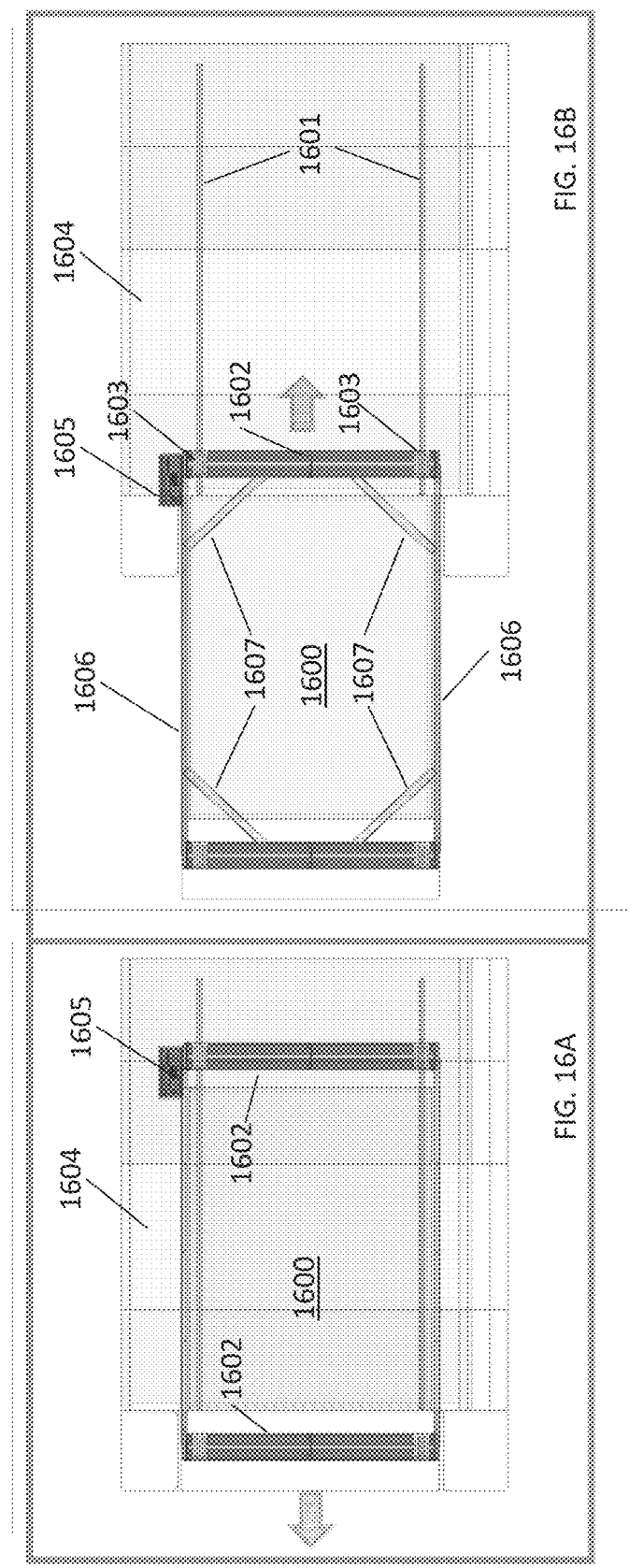
FIGS. 16A and 16B illustrate a rolling bed in accordance with various exemplary inventive embodiments.

FIGS. 16A and 16B illustrate a rolling bed in accordance with various exemplary inventive embodiments. FIG. 16A shows the rolling bed in a retracted or stored configuration under platform 1604 and FIG. 16B shows the rolling bed in a deployed configuration extending out from under platform 1604. Platform 1604 includes tracks 1601 which are engaged by wheels 1603 of drivetrain assemblies 1602 that are secured to bed 1600. In some embodiments drivetrain assemblies 1602 may be secured to bed 1600 via one or more beams perpendicular beams 1606 connected to the frame of bed 1600 as well as one or more angled tension brackets or cables 1607. Platform 1604 may include a user interface, such as a touch pad responsive to swipes, and in communication with robotic controller 1605 coupled to at least one drive train assembly 1602. Robotic controller 1605 may also be communicatively coupled to one or more sensors positioned on bed 1600, to detect the proximity of the bed with respect to surrounding items, for example to prevent the bed from running into an item, or to detect weight on the bed, for example to prevent the bed from retracting under platform 1604 if an item, such as a child is positioned on the bed. In some embodiments controller 1605 may transmit an indicator or alert in response to receipt of a signal from any such sensor to notify the user of the detected condition.

Figure 17:
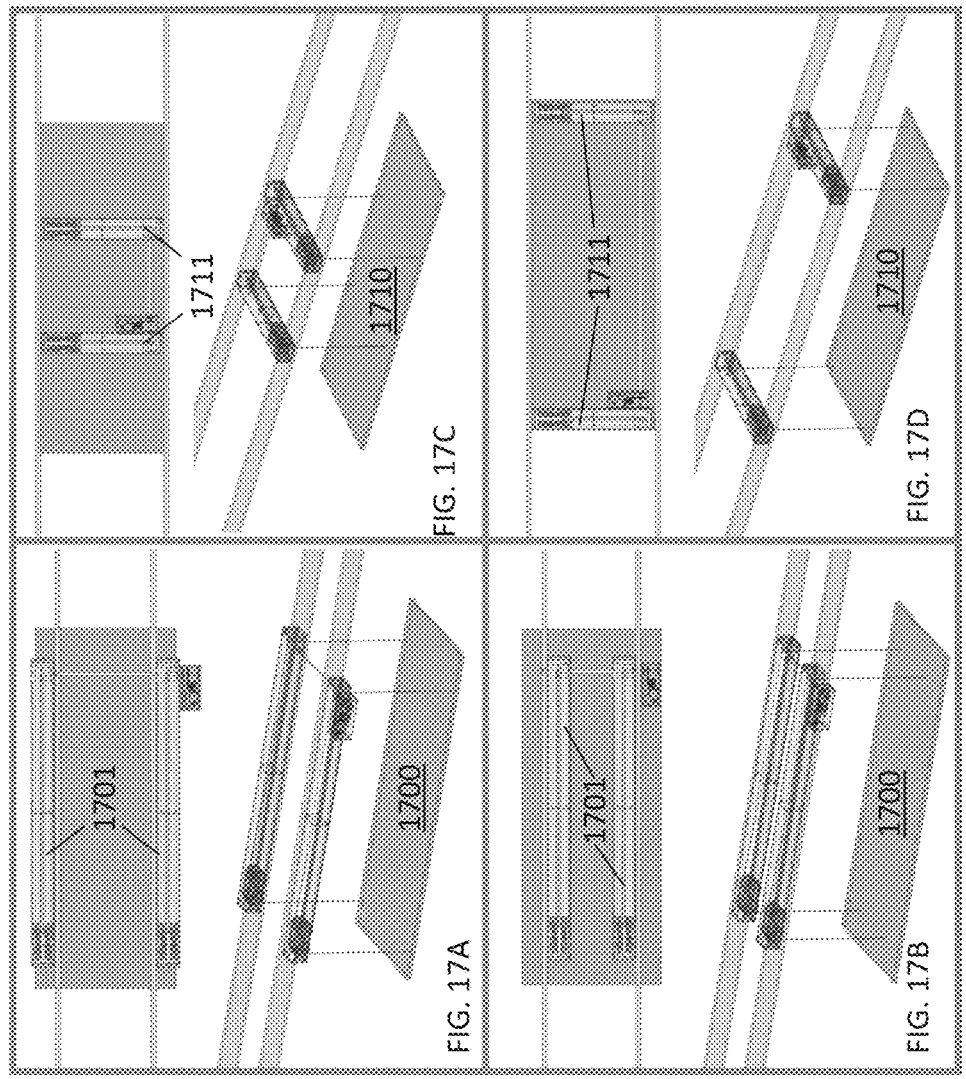
FIGS. 17A-17D illustrate a drop-down table utilizing a single robot to control multiple spools in accordance with various exemplary inventive embodiments.

FIGS. 17A-17D illustrate a drop-down table in accordance with various exemplary inventive embodiments. FIGS. 17A and 17B each demonstrate top views of cable type drivetrain assemblies 1701 connected to table 1700. FIG. 17A demonstrates drivetrain assemblies connected to table 1700 such that the cables extending from drivetrain assemblies 1701 are connected in a closer orientation than in FIG. 17B. Table 1700 may include passive legs configured to gradually extend as the table is lowered and gradually retract as the table is raised. FIGS. 17C and 17D each demonstrate top views of cable type drivetrain assemblies 1711 connected to table 1710. FIG. 17C demonstrates drivetrain assemblies connected to table 1710 such that the cables extending from drivetrain assemblies are connected in a closer orientation than in FIG. 17D.

Figure 18:
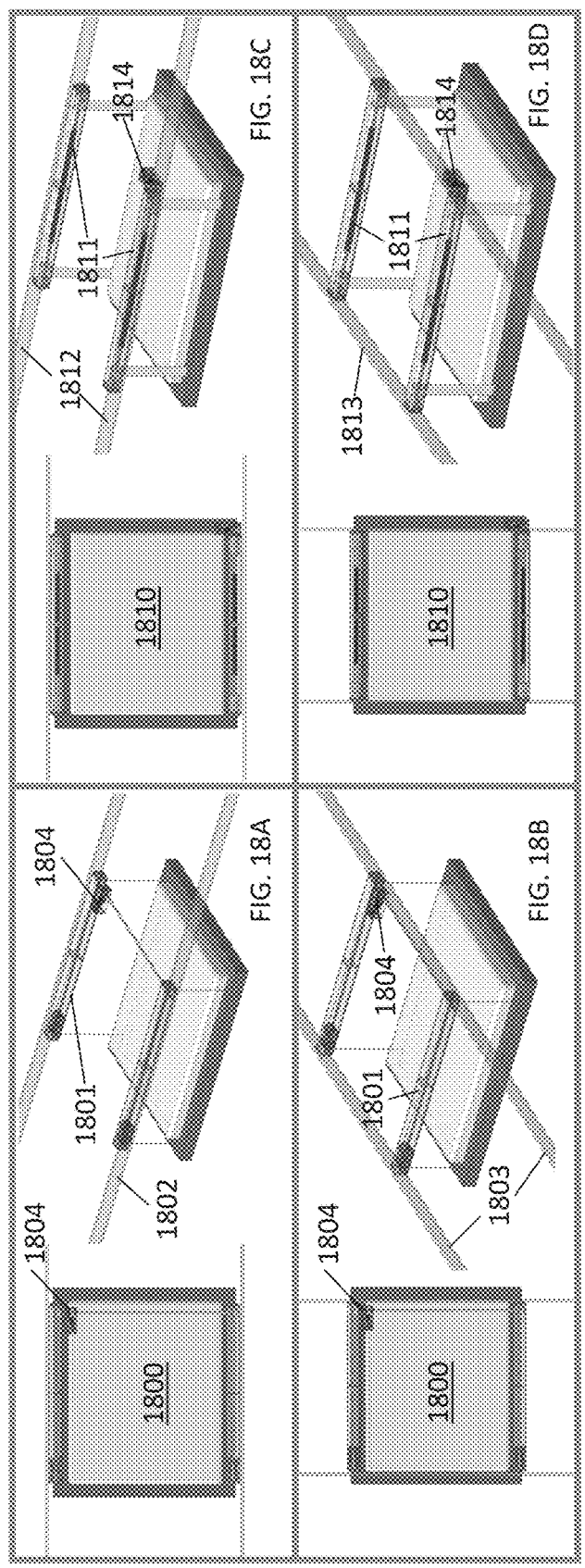
FIGS. 18A-18D illustrate a drop-down bed utilizing both cables and bands of cloth respectively in accordance with various exemplary inventive embodiments.

FIGS. 18A-18D illustrates a drop-down bed in accordance with various exemplary inventive embodiments. FIGS. 18A and 18B illustrates top views of cable type drivetrain assemblies 1801 connected to bed 1800. FIG. 18A illustrates drivetrain assemblies 1801 positioned parallel to ceiling supports 1802, such as rails of a chassis or ceiling joist, while FIG. 18B illustrates drivetrain assemblies 1801 positioned orthogonal ceiling supports 1803. As seen in FIGS. 18A and 18B the engagement and orientation of controller 1804 may be tailored to accommodate the associated ceiling supports. As discussed herein, items such as bed 1800 may include passive legs configured to gradually extend as the bed is lowered and gradually retract as the bed is raised. Additionally, since the bed starts from a ceiling configuration, the user interface may include a wireless user interface, such as a touch pad, or touch screen positioned on a surface such as a wall. FIGS. 18C and 18D illustrates top views of cloth or ribbon type drivetrain assemblies 1811 connected to bed 1810. FIG. 18C illustrates drivetrain assemblies 1811 positioned parallel to ceiling supports 1812, such as rails of a chassis or ceiling joist, while FIG. 18D illustrates drivetrain assemblies 1811 positioned orthogonal ceiling supports 1813. As seen in FIGS. 18C and 18D the engagement and orientation of controller 1814 may be tailored to accommodate the associated ceiling supports.

Figure 19:
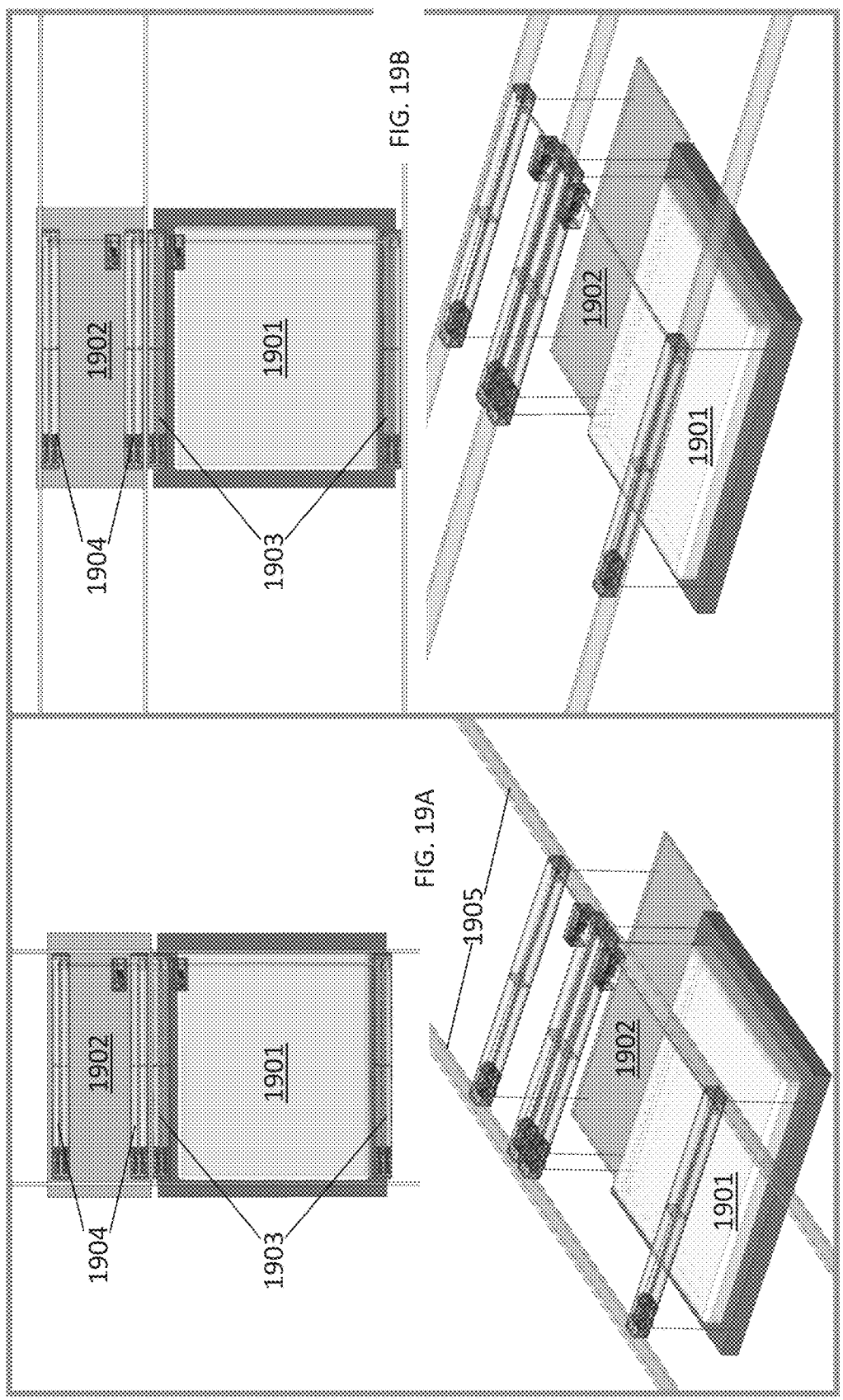
FIGS. 19A and 19B illustrate a drop-down table and bed combination in accordance with various exemplary inventive embodiments.

FIGS. 19A and 19B illustrate a drop-down table and bed combination in accordance with various exemplary inventive embodiments. As demonstrated in the illustrated embodiment of FIGS. 19A and 19B, bed 1901 and table 1902 may be oriented in a tandem arrangement and supported by corresponding drivetrain assemblies 1903 and 1904 via structural ceiling supports 1905, such as rails of a chassis or ceiling joists, which ceiling supports are oriented orthogonal to assemblies 1903 and 1904 in the illustrated embodiment. The drivetrain assemblies 1903 and 1904 may have independent robotic control systems 1906 and 1907, which may be communicatively coupled to one another via a wired or wireless communication interface. FIG. 19B illustrates assemblies 1903 and 1904 connected to ceiling supports 1908, oriented parallel to ceiling supports 1908.

Figure 20:
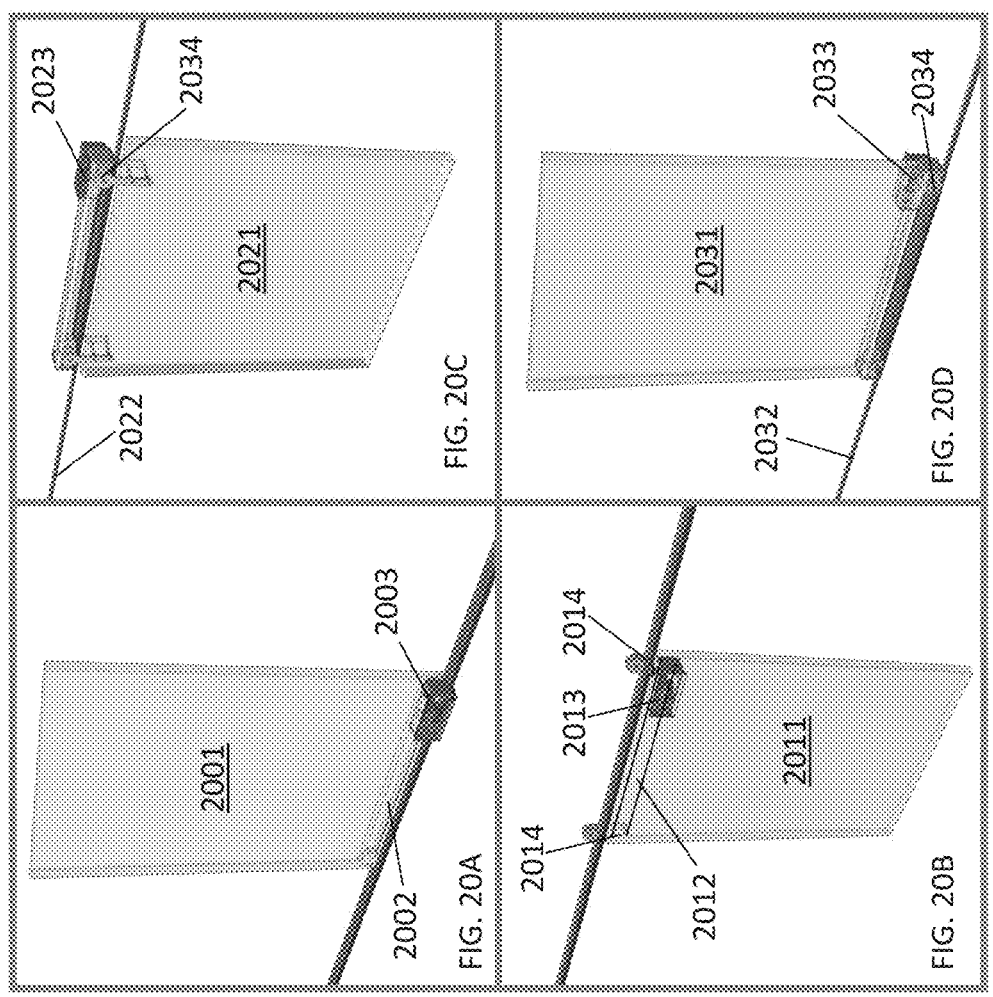
FIGS. 20A-20D illustrate a sliding panel system in accordance with various exemplary inventive embodiments.

FIGS. 20A-20D illustrate a sliding panel system in accordance with various exemplary inventive embodiments. Panel may serve as door, room divider or other architectural feature within the interior or exterior of a living space. FIG. 20A illustrates door 2001 connected to rolling drivetrain assembly 2002 and robotic control system 2003. Rolling drivetrain assembly 2002 is mounted on a lower portion of panel 2001 and is configured to interface with a floor surface. Panel 2001 may include wheels or a slide for receipt within a track mounted near an upper portion of door 2001 to guide the panel when moved pursuant to actuation of control system 2003. Panel 2001 may include one or more user interfaces, such as a pressure pad, touch pad, or touch screen that is force or gesture responsive and communicatively coupled to system 2003 to actuate panel 2001. FIG. 20B illustrates panel 2011 connected to rolling drivetrain assembly 2012 and robotic control system 2013. Rolling drivetrain assembly 2012 is coupled to an upper portion of panel 2010 via fasteners 2014 and is configured to roll on a track or rail 2004 mounted on a wall or ceiling. FIG. 20C illustrates door 2021 having a rack 2022 mounted on a top surface for engagement with a pinion 2024 of robotic control system 2023 actuatable to cause panel 2020 to slide laterally. FIG. 20D illustrates panel 2031 having a rack 2032 mounted on a bottom surface of panel 2031 for engagement with a pinion 2034 of robotic control system 2033 to cause panel 2030 to slide laterally. Panel 2031 may include wheels or a slide for receipt within a track mounted near an upper portion of panel 2031 to guide the panel when moved pursuant to actuation of control system 2033.

Figure 21:
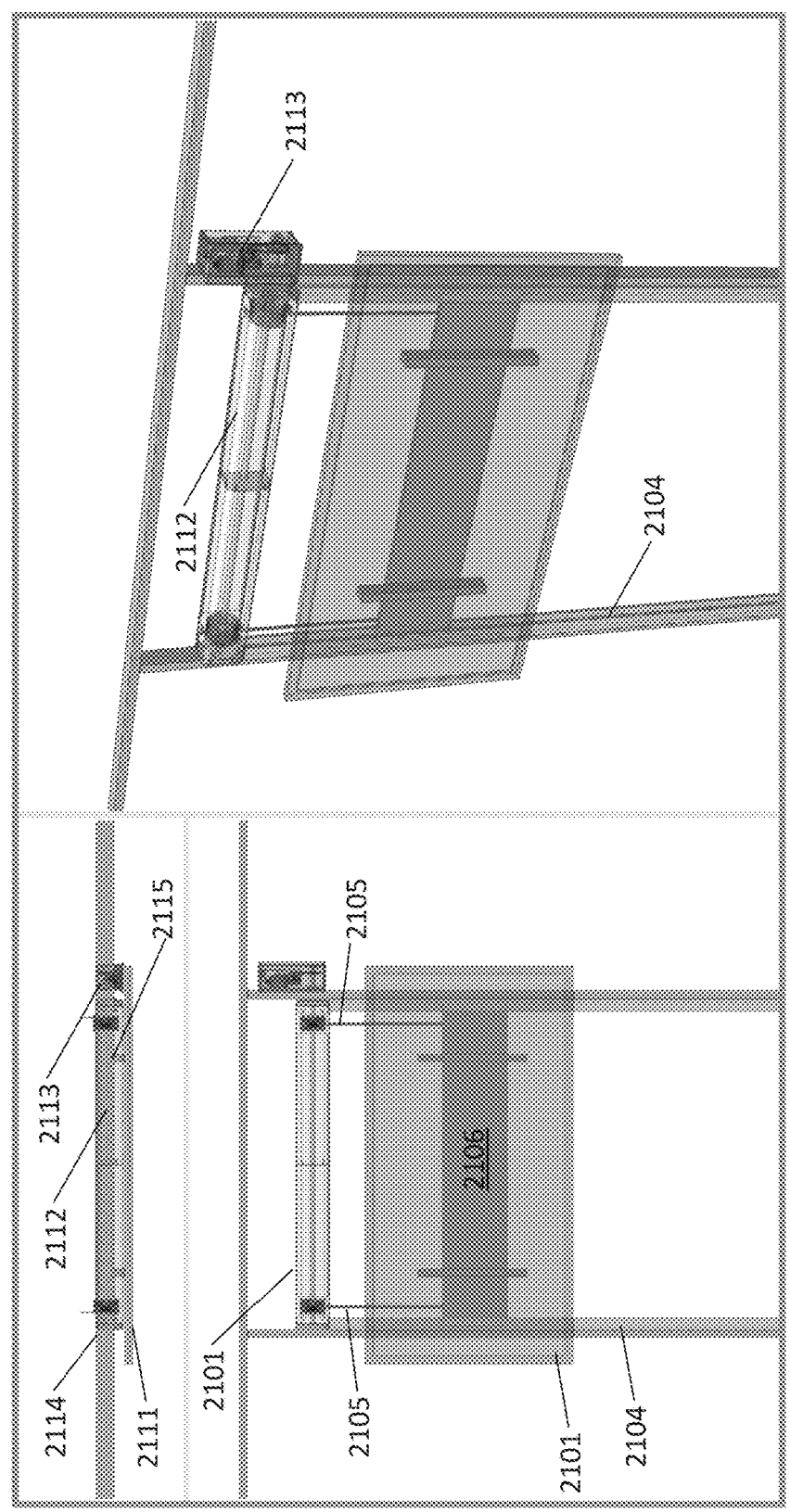
FIG. 21 illustrates adjustable display configured for vertical sliding in accordance with various exemplary inventive embodiments.

FIG. 21 illustrates an adjustable display configured for vertical sliding in accordance with various exemplary inventive embodiments. FIG. 21 illustrates a vertically displaceable television display 2101. In the illustrated embodiment, television 2101 is connected to a television bracket 2106, which is suspended by cables 2105 extending from cable drivetrain assembly 2102. Drivetrain assembly 2102 is secured to vertical support beams 2104. Drivetrain assembly 2102 is actuated by robotic controller 2103, actuatable to cause television 2101 to move in a direction having a vertical component. FIG. 21 further illustrates a television panel 2111 that may be provided to conceal the television. Panel 2111 is suspended from cables 2115 extending from cable drivetrain assembly 2112 and actuatable by robotic controller 2113. Robotic controller 2113 may be communicatively coupled to robotic controller 2103 in accordance with various embodiments. Robotic controllers 2103 and 2113 may be communicatively coupled to one or more user interfaces, such as a wall mounted user interface, configured to activate one or more of robotic controllers 2103 and 2113. In some embodiments, robotic controllers 2103 may be remotely controlled via a communication interface of a mobile device such as a mobile phone. For example controllers 2103 and 2113 may include an internet connection operable to transmit control signals transmitted by a program running on a mobile device such as mobile phone to one or more robotic controllers, such as controllers 2103 and 2113.

Figure 22:
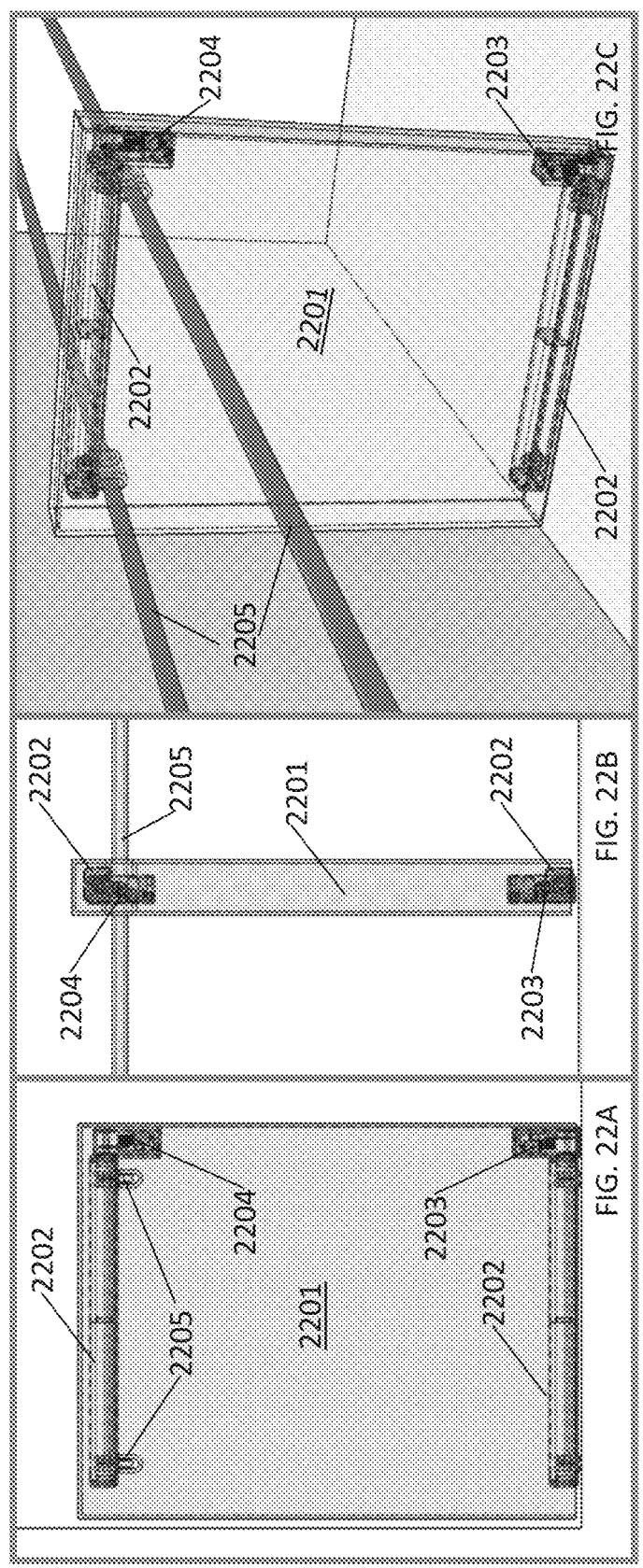
FIGS. 22A-22C illustrate a moving divider wall with coordinated movement by two interchangeable robotic systems in accordance with various exemplary inventive embodiments.

FIGS. 22A-22C illustrate a moving divider wall in accordance with various exemplary inventive embodiments. FIG. 22A provides front view of divider wall 2201. Wall 2201 may provide an enclosure for a plurality of rolling drivetrain assemblies 2202, including one mounted in an upper region of wall 2201 and one mounted in a lower region of wall 2201. As shown in FIGS. 22A-22C the wheels of the lower drivetrain assembly 2202 may extend through a bottom surface of divider wall 2201 to engage the floor in various embodiments. Wall 2201 may also include a plurality of apertures positioned in an upper region of wall 2201 through which rails, such as ceiling mounted rails 2205 extend. Ceiling mounted rails 2205 engage wheels of upper drivetrain assembly 2202. Each of the drivetrain assemblies 2202 may include a robotic controller 2203 and 2204 to control the corresponding drivetrain assemblies and cause reconfiguration of the position of wall 2201. Controllers 2203 and 2204 may be communicatively coupled in accordance with various embodiments.

Prefabricated Modular Structural Building Enclosure

Figure 23:
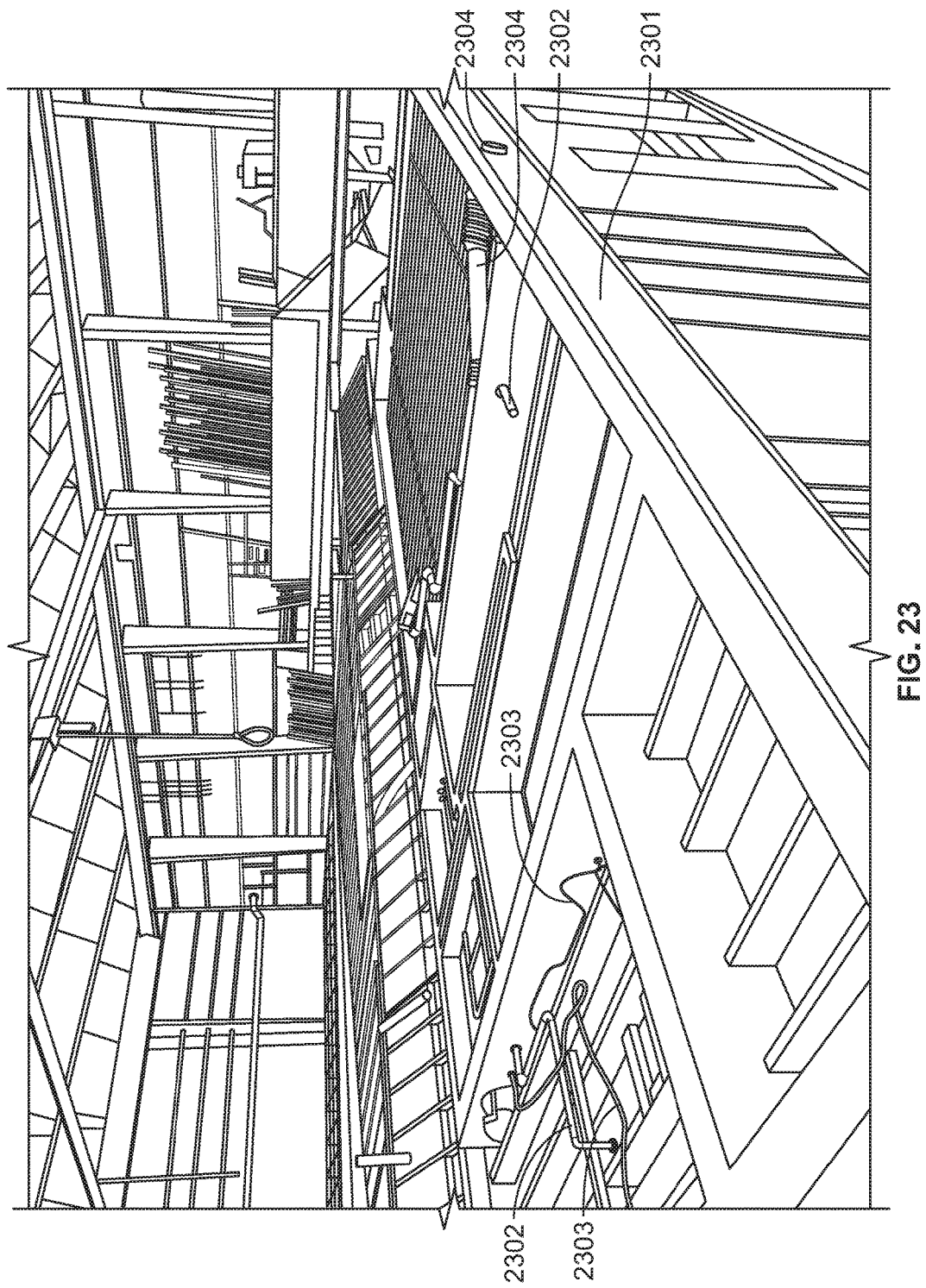
Figure 24:
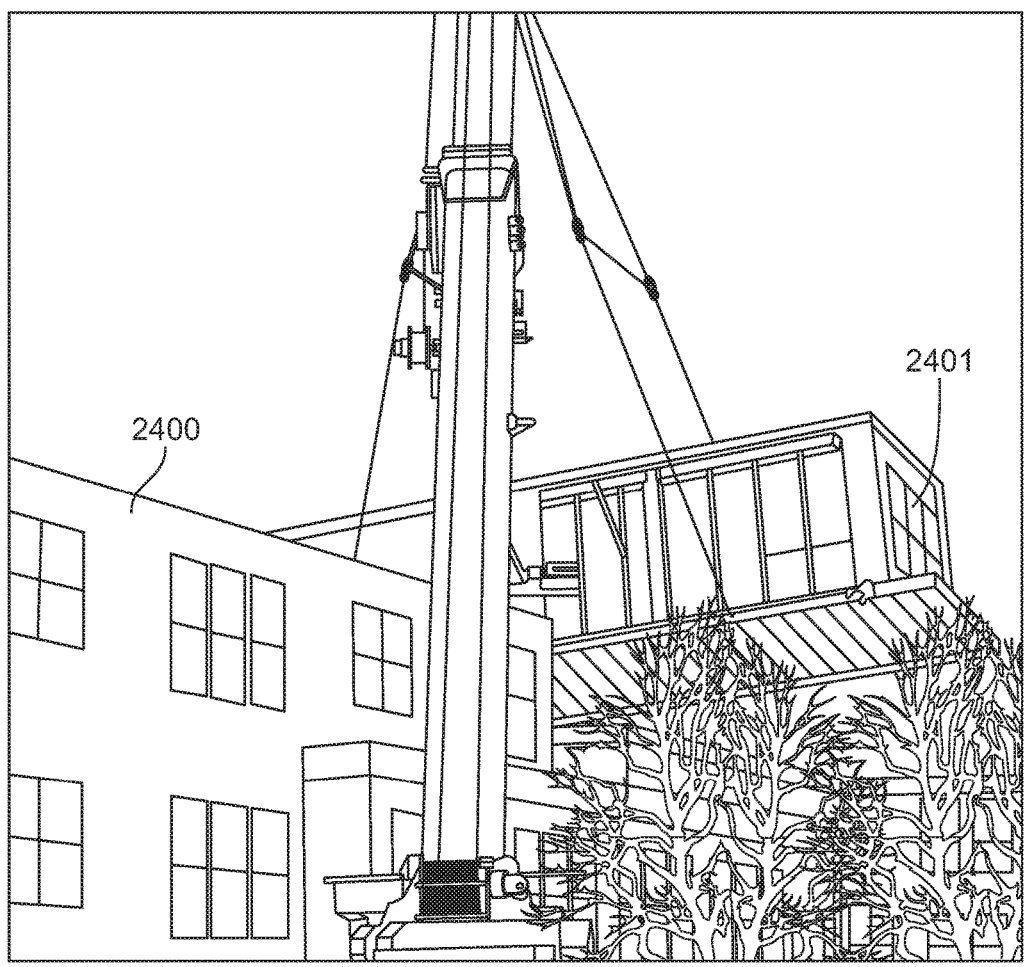
Figure 25:
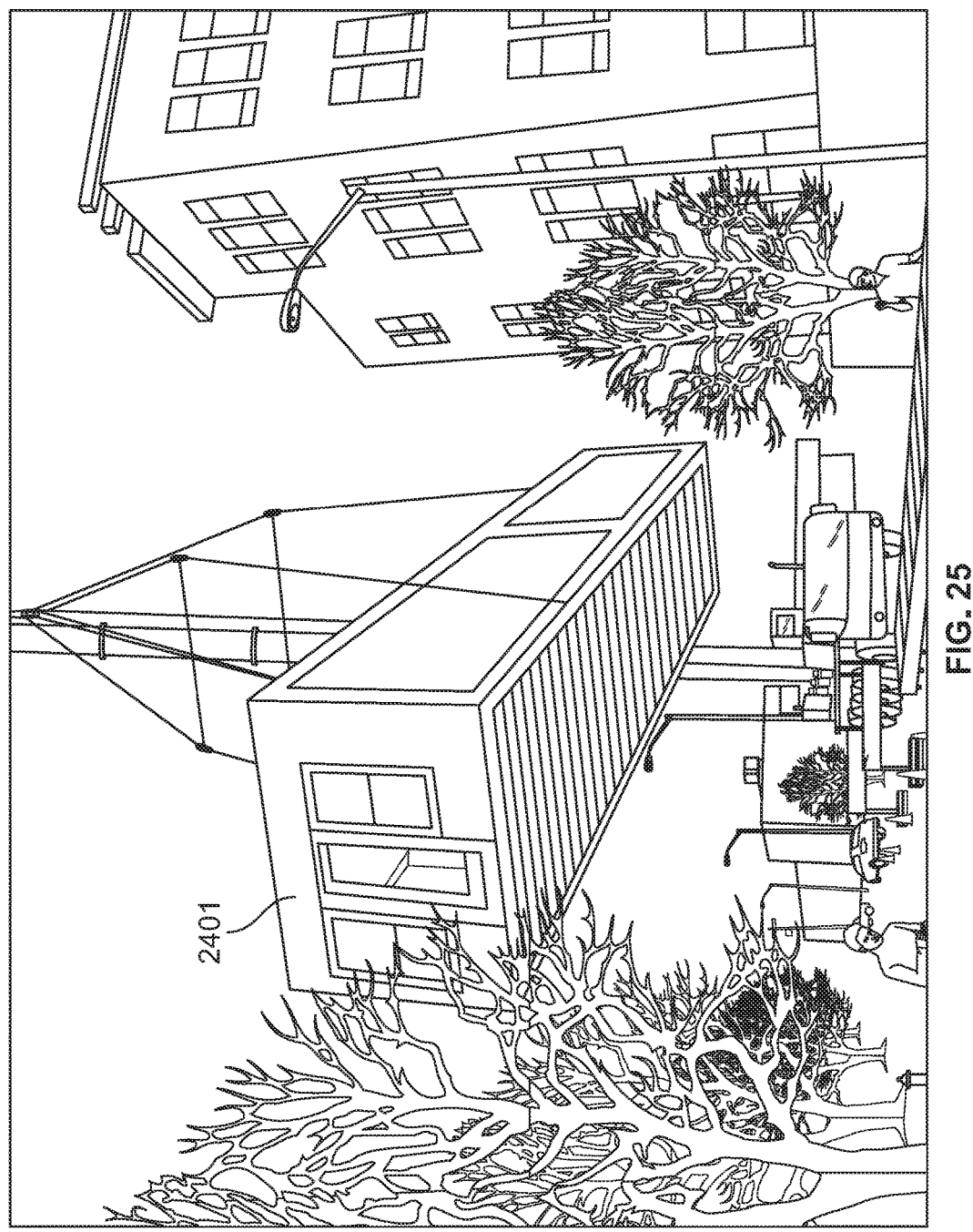

FIGS. 23-25 illustrates a modular structural enclosure in accordance with various exemplary inventive embodiments. FIG. 23 illustrates construction and assembly of a structural enclosure. As illustrated in FIG. 23, structural members 2301 may be assembled in connection with created a modular structural enclosure, such as enclosure 2401 illustrated in FIGS. 24 and 25. Structural member 2301 may be prefabricated with a plurality of system components such as integrated water lines 2302, integrated electrical lines 2303, and integrated ventilation lines 2304. In accordance with inventive embodiments components 2302-2304 may be configured in member 2301, such that connections to components 2302-2304 may be made at a plurality of location and/or may be movable to a plurality of locations within enclosure 2401 to accommodate variations in modular systems that may be integrated in enclosure 2401, and variations in the orientation, position, or components of a modular system in accordance with various embodiments. As illustrated in FIGS. 23 and 24, a plurality of structural members 2301 may be moved into place and coupled to create enclosure 2401, and a plurality of enclosures 2401 may be engaged to create a complex or building 2400.

Figure 26A:
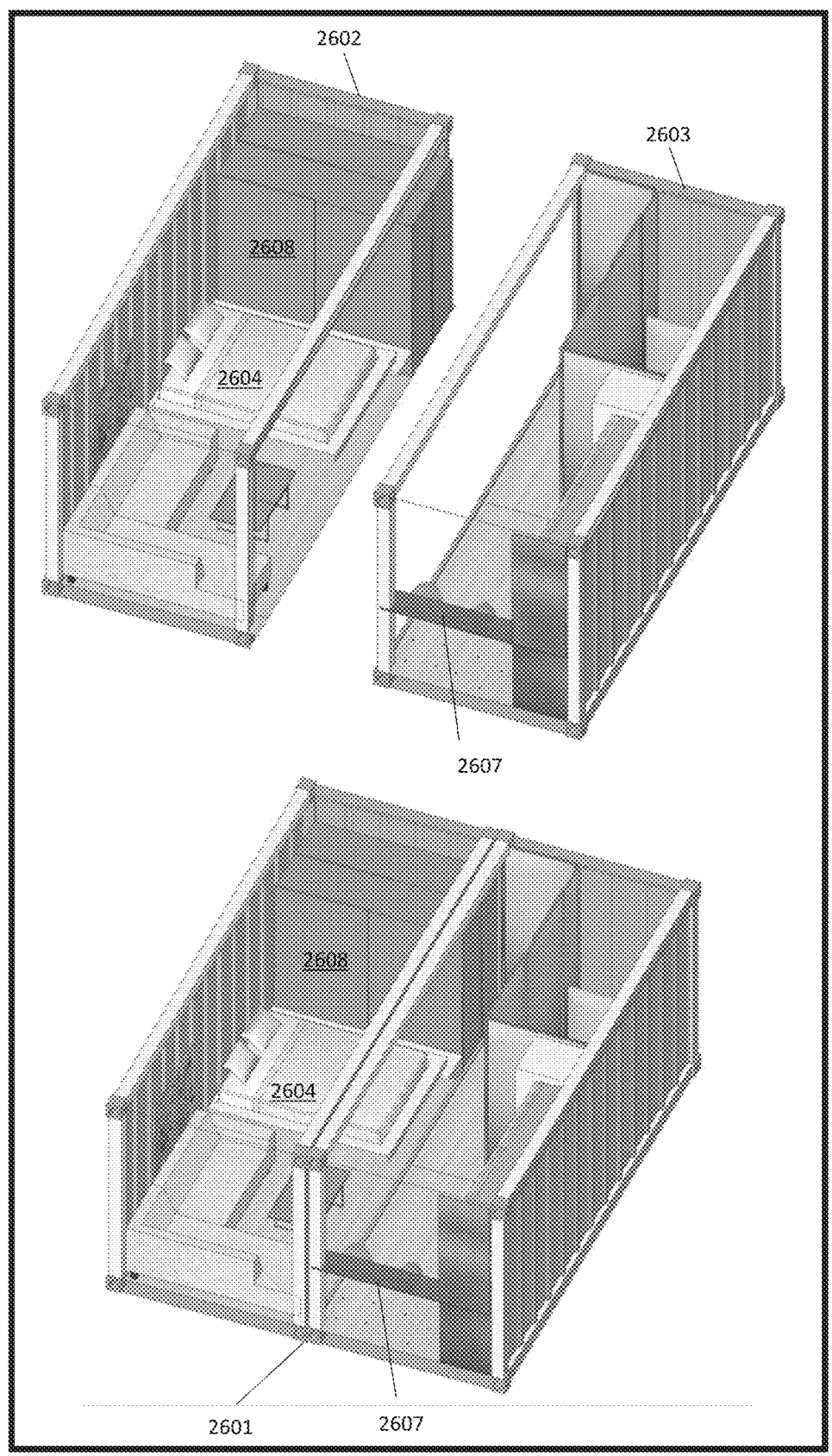
Figure 26B:
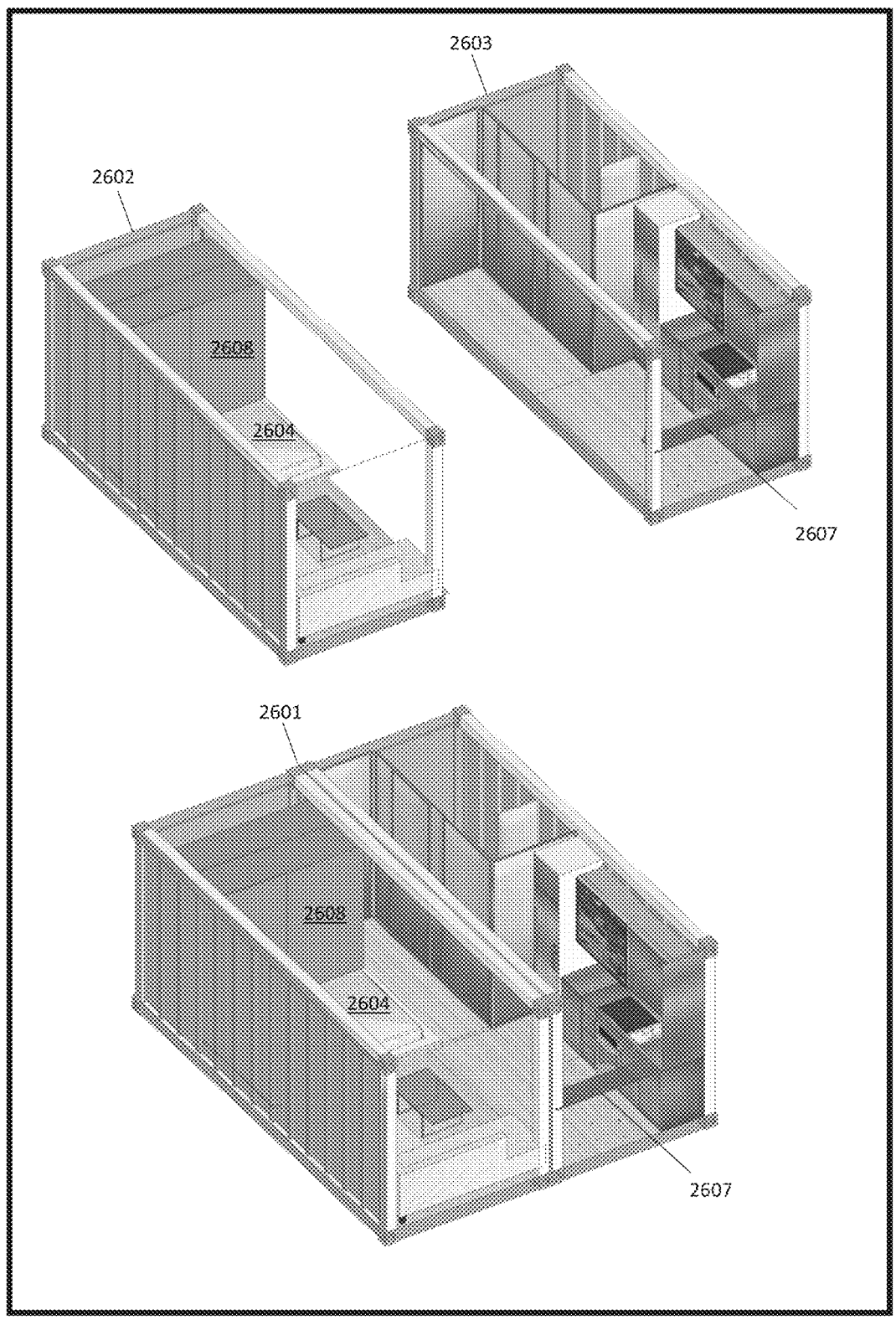
Figure 26C:
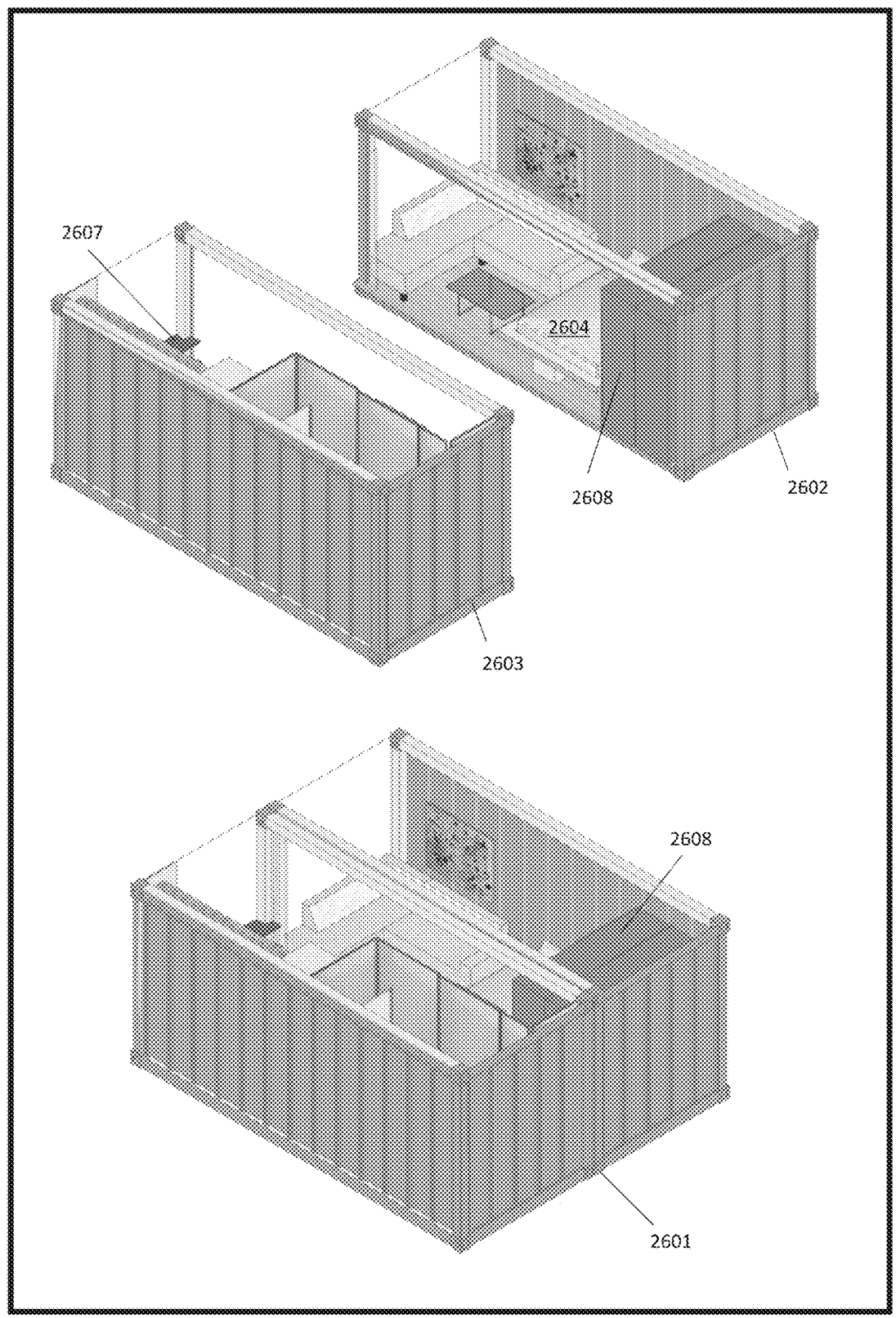

FIG. 26A-26C illustrates a modular structural enclosure in accordance with various exemplary inventive embodiments. FIG. 26 illustrates the utilization of two shipping containers 2602 & 2603 combined to create living space 2601, prefabricated with a plurality of system components. Prefabricated enclosures may work with a number of containers, from one to several, and in a variety of configurations. Although not limited to the illustrated examples, FIG. 26 and FIG. 27 display the use of two containers side-by-side. In addition to subsystems illustrated in FIG. 23, FIG. 26A-C illustrates the prefabricated integration of transformable infill, including but not limited to a drop-down bed 2604, a robotic closet 2608, a height-adjustable counter surface 2607, and a drop-down table 2605. Each shipping container 2602 & 2603 illustrated in FIG. 26A-C is constructed from metal. However, prefabricated structure may be wood, as shown in FIG. 23-25, metal or any combination of materials. Prefabricated containers may strategically integrate categories of infill into each container, as illustrated in FIG. 26A-B; whereas a majority of transformable infill is packaged within left module 2602 and all plumbing systems are packaged into the right module 2603. FIG. 26A illustrates the majority of transformable infill packaged within container 2602, compartmentalizing a majority of the electromechanical systems. FIG. 26B illustrates all fixtures requiring plumbing packaged within container 2603, allowing prefabrication to minimize number of on-site construction plumbing connections.

FIGS. 27A-27D illustrates the transforming room plan of the modular structure enclosure. The two 20 ft by 8 ft shipping containers, 2602 & 2603, are assembled to create a 320 square foot living space 2601. All plumbed fixtures are packaged within partition 2603, whereas the majority of transformable infill is contained within partition 2602. FIG. 27A illustrates the living space configured for sleep, with the drop-down bed 2604 lowered into the room. FIG. 27B illustrates the living space configured for dining with the drop-down table 2605 lowered into the room. FIG. 27C illustrates the living space configured for social gatherings, as all transformable infill is stored up and out of the way. FIG. 27D illustrates the utilization of the robotic closet 2608, where concealed storage becomes accessible by driving into a different position within the room.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed.

Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments of the invention can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single computer or distributed among multiple computers.

In this respect, various aspects of the invention may be embodied at least in part as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium or non-transitory medium) encoded with one or more programs that, when executed on one or more computers or other processors, perform methods that implement the various embodiments of the technology discussed above. The computer readable medium or media can be transportable, such that the program or programs stored thereon can be loaded onto one or more different computers or other processors 907 to implement various aspects of the present technology as discussed above.

The terms "program" or "software" are used herein in a generic sense to refer to any type of computer code or set of computer-executable instructions that can be employed to program a computer or other processor 907 to implement various aspects of the present technology as discussed above. Additionally, it should be appreciated that according to one aspect of this embodiment, one or more computer programs that when executed perform methods of the present technology need not reside on a single computer or processor, but may be distributed in a modular fashion amongst a number of different computers or processors, such as mobile devices 905, to implement various aspects of the present technology.

Computer-executable instructions may be in many forms, such as program modules, executed by one or more computers or other devices 907 and 905. Generally, program modules include routines, programs, objects, components, data structures, etc. that perform particular tasks or implement particular abstract data types. Typically the functionality of the program modules may be combined or distributed as desired in various embodiments.

Also, the technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. For example, various components may be programmed for coordinated movements, wherein the actuation of motion of one component, triggers actuation of another component that is related to the directly actuated component, that interfaces with the directly actuated component, or that is in or will be in the path of the directly actuated component as it moves along a trajectory dictated by the actuation command.

The invention claimed is:

1. A system for transforming a living space, the system comprising:
    a chassis;
    at least one configurable unit movably coupled to the chassis for at least one of translation and rotation with respect to the chassis;
    at least one drivetrain assembly movably coupling the at least one configurable unit to the chassis;
    at least one actuator coupled to at least one configurable unit by the at least one drivetrain assembly; and
    at least one robotic controller communicatively coupled to the at least one actuator, the at least one robotic controller configured to electronically control actuation of the at least one actuator coupled to at least one configurable unit to cause the at least one configurable unit to move from a recessed position to an active position by at least one of translation and rotation on the chassis; and
    a tactile user interface communicatively coupled to the at least one robotic controller to cause transmission of a command to the at least one robotic controller, the command providing a directional specific electrical actuation instruction corresponding to a direction of a gesture received via the tactile user interface.

2. The system of claim 1, wherein a downward gesture on the tactile user interface causes lowering of at least one configurable unit and wherein an upward gesture on the tactile user interface causes a lifting of at least one configurable unit.

3. The system of claim 1, wherein a left gesture on the tactile user interface causes translation of at least one configurable unit in a left direction.

4. The system of claim 1, wherein a left gesture on the tactile user interface causes translation of at least one configurable unit in a left direction and wherein a right gesture on the tactile user interface causes translation of at least one configurable unit in a right direction.

5. The system of claim 1, further comprising at least one sensor electrically coupled to the at least one robotic controller wherein the at least one robotic controller is configured to electronically control actuation of the at least one actuator coupled to at least one configurable unit based at least in part on a sensor signal received from the at least one sensor.

6. The system of claim 1, wherein the at least one configurable unit includes at least one furniture unit.

7. The system of claim 1, wherein the tactile interface includes a touch screen.

8. The system of claim 1, wherein the direction of the gesture is the same as a direction of the directional specific electrical actuation instruction.

9. The system of claim 1, wherein the gesture comprises a swipe.

10. A system for transforming a living space, the system comprising:
    a chassis;
    at least one configurable unit movably coupled to the chassis for at least one of translation and rotation with respect to the chassis;
    at least one drivetrain assembly movably coupling the at least one configurable unit to the chassis;
    at least one actuator coupled to the at least one configurable unit by the at least one drivetrain assembly;
    at least one robotic controller communicatively coupled to the at least one actuator, the at least one robotic controller configured to electronically control actuation of the at least one actuator coupled to at least one configurable unit to cause the at least one configurable unit to move from a recessed position to an active position by at least one of translation and rotation on the chassis; and
    a tactile user interface coupled to the at least one configurable unit and communicatively coupled to the at least one robotic controller controller to cause transmission of a command to the at least one robotic controller, the command providing a force specific electrical actuation instruction proportional to a detected magnitude of a physical input received via the tactile user interface, such that at least one first detected magnitude of a first physical input causes generation of a first electrical actuation instruction at a first force and a second detected magnitude of a second physical input that is less than the first detected magnitude of a first physical input causes generation of a second electrical actuation instruction at a second force that is less than the first force.

11. The system of claim 10, wherein the user interface includes at least one pressure sensor.

12. The system of claim 10, further comprising at least one sensor electrically coupled to the at least one robotic controller wherein the at least one robotic controller is configured to electronically control actuation of the at least one actuator coupled to the at least one configurable unit based at least in part on a sensor signal received from the at least one sensor.

13. The system of claim 10, wherein the at least one configurable unit includes at least one furniture unit.

14. The system of claim 10, wherein the detected magnitude is detected based on a speed of the physical input.

15. The system of claim 10, wherein the user interface is coupled to the at least one configurable unit.

* * * * *